(12) United States Patent
Asakura et al.

(10) Patent No.: US 9,113,074 B2
(45) Date of Patent: Aug. 18, 2015

(54) IMAGING APPARATUS, IMAGING METHOD, AND COMPUTER READABLE STORAGE MEDIUM FOR APPLYING SPECIAL EFFECTS PROCESSING TO AN AUTOMATICALLY SET REGION OF A STEREOSCOPIC IMAGE

(75) Inventors: Yasuo Asakura, Hachioji (JP); Mika Muto, Tachikawa (JP)

(73) Assignee: Olympus Corporation, Tokyo (JP)

( * ) Notice: Subject to any disclaimer, the term of this patent is extended or adjusted under 35 U.S.C. 154(b) by 608 days.

(21) Appl. No.: 13/330,160

(22) Filed: Dec. 19, 2011

(65) Prior Publication Data

US 2012/0163659 A1    Jun. 28, 2012

(30) Foreign Application Priority Data

Dec. 22, 2010  (JP) ................................. 2010-286548
Dec. 28, 2010  (JP) ................................. 2010-293996

(51) Int. Cl.
*G06K 9/36* (2006.01)
*H04N 5/232* (2006.01)
*H04N 13/02* (2006.01)
*H04N 13/04* (2006.01)

(52) U.S. Cl.
CPC ....... *H04N 5/23219* (2013.01); *H04N 5/23216* (2013.01); *H04N 5/23293* (2013.01); *H04N 13/0217* (2013.01); *H04N 13/0221* (2013.01); *H04N 13/0289* (2013.01); *H04N 13/0296* (2013.01); *H04N 13/0409* (2013.01)

(58) Field of Classification Search
CPC .......... H04N 13/0217; H04N 13/0221; H04N 13/0289; H04N 13/0296; H04N 13/409; H04N 5/262; G06K 9/00
See application file for complete search history.

(56) References Cited

U.S. PATENT DOCUMENTS 7,444,022 B2 * 10/2008 Paschalakis ................... 382/224
8,885,922 B2 * 11/2014 Ito et al. ......................... 382/154
2001/0050756 A1 * 12/2001 Lipton et al. .................... 353/15

(Continued)

FOREIGN PATENT DOCUMENTS

JP   2002-044516    2/2002
JP   2005-347886    12/2005

(Continued)

OTHER PUBLICATIONS

Mayhew et al. "Three dimensional visualization of geographical terrain data using termporal parallax difference induction" Human Vision and Electronic Imaging XIV, edited by Bernice E. Rogowitz, Thrasyvoulos N. Pappas, Proc. of SPIE-IS&T Electronic Imaging, SPIE vol. 7240, pp. 1-11.*

(Continued)

*Primary Examiner* — Chan Park
*Assistant Examiner* — Mia M Thomas
(74) *Attorney, Agent, or Firm* — John C. Pokotylo; Straub & Pokotylo

(57) ABSTRACT

An imaging apparatus includes an imaging unit that generates a pair of pieces of image data mutually having a parallax by capturing a subject, an image processing unit that performs special effect processing, which is capable of producing a visual effect by combining a plurality of pieces of image processing, on a pair of images corresponding to the pair of pieces of image data, and a region setting unit that sets a region where the image processing unit performs the special effect processing on the pair of images.

19 Claims, 25 Drawing Sheets

(56) References Cited

U.S. PATENT DOCUMENTS

| | | | |
|---|---|---|---|
| 2002/0071616 A1* | 6/2002 | Yoshida | 382/305 |
| 2003/0002729 A1* | 1/2003 | Wittenbrink | 382/154 |
| 2003/0043262 A1* | 3/2003 | Takemoto et al. | 348/46 |
| 2004/0061726 A1* | 4/2004 | Dunn et al. | 345/855 |
| 2004/0145655 A1* | 7/2004 | Tomita | 348/51 |
| 2004/0170317 A1* | 9/2004 | Pettigrew et al. | 382/162 |
| 2004/0252286 A1* | 12/2004 | Murray et al. | 355/28 |
| 2005/0041854 A1* | 2/2005 | Pettigrew et al. | 382/162 |
| 2005/0053274 A1* | 3/2005 | Mayer et al. | 382/154 |
| 2005/0244050 A1* | 11/2005 | Nomura et al. | 382/154 |
| 2005/0270284 A1* | 12/2005 | Martin | 345/419 |
| 2006/0013472 A1* | 1/2006 | Kagitani | 382/154 |
| 2006/0203335 A1* | 9/2006 | Martin et al. | 359/462 |
| 2007/0115371 A1* | 5/2007 | Enomoto et al. | 348/222.1 |
| 2008/0136937 A1* | 6/2008 | Murakoshi | 348/231.2 |
| 2008/0204656 A1* | 8/2008 | Fujita et al. | 351/206 |
| 2009/0030552 A1* | 1/2009 | Nakadai et al. | 700/258 |
| 2009/0091531 A1* | 4/2009 | Hama et al. | 345/157 |
| 2009/0153664 A1* | 6/2009 | Higuchi et al. | 348/148 |
| 2009/0167900 A1* | 7/2009 | Chang et al. | 348/240.99 |
| 2009/0174705 A1* | 7/2009 | Martin | 345/419 |
| 2009/0284584 A1* | 11/2009 | Wakabayashi et al. | 348/44 |
| 2010/0039513 A1* | 2/2010 | Glickman et al. | 348/143 |
| 2010/0128116 A1* | 5/2010 | Sato et al. | 348/65 |
| 2010/0165101 A1* | 7/2010 | Kludas et al. | 348/135 |
| 2011/0025825 A1* | 2/2011 | McNamer et al. | 348/46 |
| 2011/0064282 A1* | 3/2011 | Abramovich et al. | 382/124 |
| 2011/0169821 A1* | 7/2011 | Ishiguchi | 345/419 |
| 2011/0175980 A1* | 7/2011 | Yanagisawa | 348/43 |
| 2012/0038631 A1* | 2/2012 | Mayhew et al. | 345/419 |
| 2012/0163702 A1* | 6/2012 | Ikeda | 382/154 |
| 2012/0257018 A1* | 10/2012 | Shigemura et al. | 348/46 |
| 2013/0113891 A1* | 5/2013 | Mayhew et al. | 348/47 |
| 2013/0208099 A1* | 8/2013 | Ohmi | 348/54 |
| 2014/0078268 A1* | 3/2014 | Watanabe et al. | 348/54 |
| 2014/0160257 A1* | 6/2014 | Shimizu | 348/54 |
| 2014/0168385 A1* | 6/2014 | Sudo et al. | 348/47 |

FOREIGN PATENT DOCUMENTS

| | | |
|---|---|---|
| JP | 2009-053748 | 3/2009 |
| JP | 2010-206774 | 9/2010 |
| WO | WO 2012/001970 | 6/2011 |

OTHER PUBLICATIONS

Office Action from corresponding Japanese Patent Application Serial No. 2010-293996 (1 pg.), mailed Jul. 22, 2014, with translation (2 pgs.).

* cited by examiner

FIG.5

| SPECIAL EFFECT (ART FILTER) | | PROCESSING CONTENT |
|---|---|---|
| Art1 | FANTASTIC FOCUS | 1. TONE CURVE PROCESSING |
| | | 2. BLURRING PROCESSING |
| | | 3. SYNTHESIS PROCESSING |
| Art2 | ROUGH MONOCHROME | 1. EDGE ENHANCEMENT PROCESSING |
| | | 2. LEVEL CORRECTION OPTIMIZATION PROCESSING |
| | | 3. NOISE PATTERN GENERATION & SYNTHESIS PROCESSING |
| | | 4. CONTRAST PROCESSING |
| Art3 | GENTLE SEPIA | 1. LEVEL CORRECTION OPTIMIZATION PROCESSING |
| | | 2. TONE CURVE PROCESSING |
| | | 3. HUE/SATURATION SEPIA CONVERSION |
| | | 4. DARK HUE ROTATION PROCESSING |
| Art4 | POP ART | 1. HUE/SATURATION PROCESSING |
| | | 2. CONTRAST PROCESSING |
| Art6 | TOY PHOTO | 1. WHITE BALANCE PROCESSING |
| | | 2. CONTRAST PROCESSING |
| | | 3. SHADING PROCESSING |
| Art7 | DIORAMA | 1. HUE/SATURATION PROCESSING |
| | | 2. CONTRAST PROCESSING |
| | | 3. THREE-TIME BLURRING PROCESSING |
| | | 4. THREE-TIME SYNTHESIS PROCESSING |

FIG.16

| SPECIAL EFFECT (ART FILTER) | | PROCESSING CONTENT | | |
|---|---|---|---|---|
| | | PERSON | OTHER THAN PERSON | LANDSCAPE |
| Art1 | FANTASTIC FOCUS | 1. TONE CURVE PROCESSING (WEAK) | 1. TONE CURVE PROCESSING (STRONG) | 1. TONE CURVE PROCESSING (STRONG) |
| | | 2. BLURRING PROCESSING (STRONG) | 2. BLURRING PROCESSING (WEAK) | 2. BLURRING PROCESSING (STRONG) |
| | | 3. SYNTHESIS PROCESSING | 3. SYNTHESIS PROCESSING | 3. SYNTHESIS PROCESSING |
| Art2 | ROUGH MONOCHROME | 1. EDGE ENHANCEMENT PROCESSING (WEAK) | 1. EDGE ENHANCEMENT PROCESSING (WEAK) | 1. EDGE ENHANCEMENT PROCESSING (STRONG) |
| | | 2. LEVEL CORRECTION OPTIMIZATION PROCESSING (WEAK) | 2. LEVEL CORRECTION OPTIMIZATION PROCESSING (STRONG) | 2. LEVEL CORRECTION OPTIMIZATION PROCESSING (STRONG) |
| | | 3. NOISE PATTERN GENERATION & SYNTHESIS PROCESSING (WEAK) | 3. NOISE PATTERN GENERATION & SYNTHESIS PROCESSING (STRONG) | 3. NOISE PATTERN GENERATION & SYNTHESIS PROCESSING (STRONG) |
| | | 4. CONTRAST PROCESSING (WEAK) | 4. CONTRAST PROCESSING (STRONG) | 4. CONTRAST PROCESSING (STRONG) |
| Art3 | GENTLE SEPIA | 1. LEVEL CORRECTION OPTIMIZATION PROCESSING | 1. LEVEL CORRECTION OPTIMIZATION PROCESSING | 1. LEVEL CORRECTION OPTIMIZATION PROCESSING |
| | | 2. TONE CURVE PROCESSING (WEAK) | 2. TONE CURVE PROCESSING (STRONG) | 2. TONE CURVE PROCESSING (STRONG) |
| | | 3. HUE/SATURATION SEPIA CONVERSION (WEAK) | 3. HUE/SATURATION SEPIA CONVERSION (WEAK) | 3. HUE/SATURATION SEPIA CONVERSION (STRONG) |
| | | 4. DARK HUE ROTATION PROCESSING (WEAK) | 4. DARK HUE ROTATION PROCESSING (WEAK) | 4. DARK HUE ROTATION PROCESSING (STRONG) |
| Art4 | POP ART | 1. HUE/SATURATION PROCESSING (WEAK) | 1. HUE/SATURATION PROCESSING (STRONG) | 1. HUE/SATURATION PROCESSING (STRONG) |
| | | 2. CONTRAST PROCESSING (WEAK) | 2. CONTRAST PROCESSING (STRONG) | 2. CONTRAST PROCESSING (WEAK) |

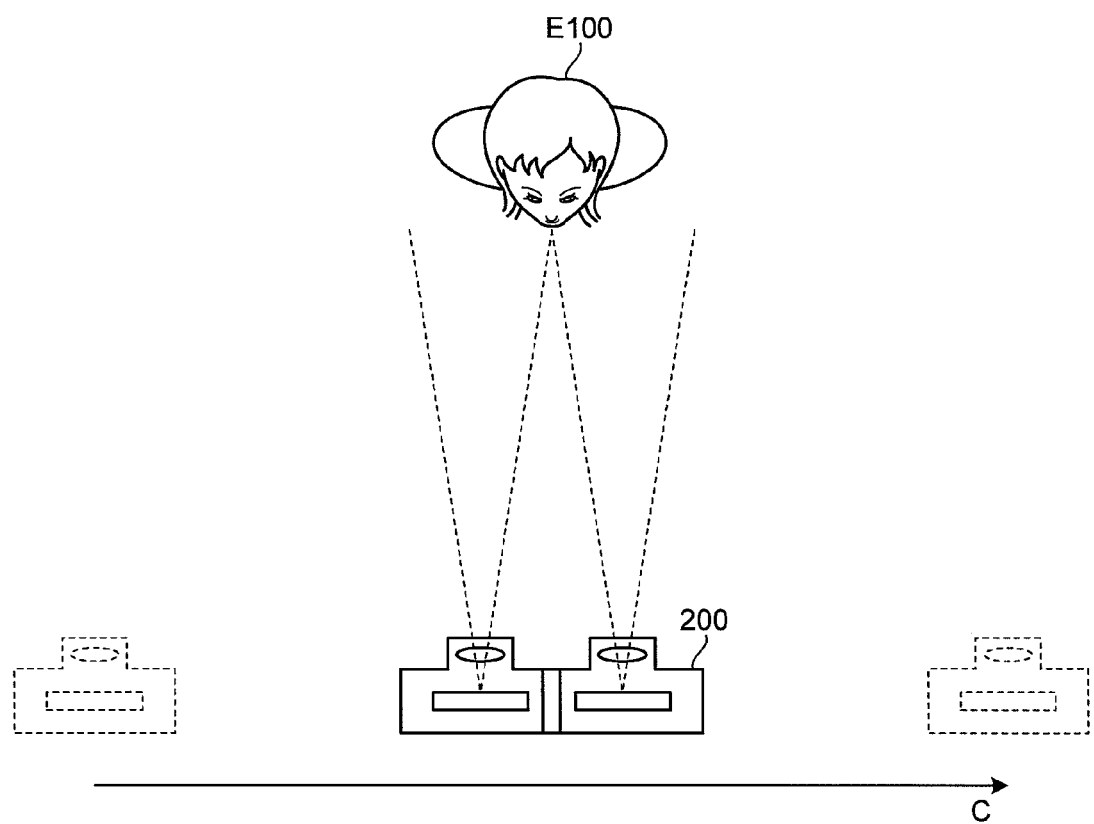

FIG.19

| SPECIAL EFFECT (ART FILTER) | | MAN PROCESSING CONTENT | MAN DEGREE OF RECOMMENDATION | WOMAN PROCESSING CONTENT | WOMAN DEGREE OF RECOMMENDATION | BABY/PET PROCESSING CONTENT | BABY/PET DEGREE OF RECOMMENDATION |
|---|---|---|---|---|---|---|---|
| Art1 | FANTASTIC FOCUS | 1. TONE CURVE PROCESSING (WEAK)<br>2. BLURRING PROCESSING (STRONG)<br>3. SYNTHESIS PROCESSING | 4 | 1. TONE CURVE PROCESSING (STRONG)<br>2. BLURRING PROCESSING (WEAK)<br>3. SYNTHESIS PROCESSING | 1 | 1. TONE CURVE PROCESSING (STRONG)<br>2. BLURRING PROCESSING (STRONG)<br>3. SYNTHESIS PROCESSING | 1 |
| Art2 | ROUGH MONOCHROME | 1. EDGE ENHANCEMENT PROCESSING (STRONG)<br>2. LEVEL CORRECTION OPTIMIZATION PROCESSING (STRONG)<br>3. NOISE PATTERN GENERATION & SYNTHESIS PROCESSING (STRONG)<br>4. CONTRAST PROCESSING (STRONG) | 2 | 1. EDGE ENHANCEMENT PROCESSING (WEAK)<br>2. LEVEL CORRECTION OPTIMIZATION PROCESSING (STRONG)<br>3. NOISE PATTERN GENERATION & SYNTHESIS PROCESSING (STRONG)<br>4. CONTRAST PROCESSING (STRONG) | 4 | 1. EDGE ENHANCEMENT PROCESSING (WEAK)<br>2. LEVEL CORRECTION OPTIMIZATION PROCESSING (WEAK)<br>3. NOISE PATTERN GENERATION & SYNTHESIS PROCESSING (WEAK)<br>4. CONTRAST PROCESSING (STRONG) | 3 |
| Art3 | GENTLE SEPIA | 1. LEVEL CORRECTION OPTIMIZATION PROCESSING<br>2. TONE CURVE PROCESSING (STRONG)<br>3. HUE/SATURATION SEPIA CONVERSION (WEAK)<br>4. DARK HUE ROTATION PROCESSING (WEAK) | 3 | 1. LEVEL CORRECTION OPTIMIZATION PROCESSING<br>2. TONE CURVE PROCESSING (STRONG)<br>3. HUE/SATURATION SEPIA CONVERSION (STRONG)<br>4. DARK HUE ROTATION PROCESSING (STRONG) | 3 | 1. LEVEL CORRECTION OPTIMIZATION PROCESSING<br>2. TONE CURVE PROCESSING (WEAK)<br>3. HUE/SATURATION SEPIA CONVERSION (WEAK)<br>4. DARK HUE ROTATION PROCESSING (WEAK) | 4 |
| Art4 | POP ART | 1. HUE/SATURATION PROCESSING (STRONG)<br>2. CONTRAST PROCESSING (STRONG) | 1 | 1. HUE/SATURATION PROCESSING (STRONG)<br>2. CONTRAST PROCESSING (STRONG) | 2 | 1. HUE/SATURATION PROCESSING (WEAK)<br>2. CONTRAST PROCESSING (WEAK) | 2 |
| Art5 | UKIYO-E | 1. TONE CURVE PROCESSING<br>2. HUE SATURATION PROCESSING<br>3. EDGE PROCESSING (STRONG) | 5 | 1. TONE CURVE PROCESSING<br>2. HUE SATURATION PROCESSING<br>3. EDGE PROCESSING (STRONG) | 5 | 1. TONE CURVE PROCESSING<br>2. HUE SATURATION PROCESSING<br>3. EDGE PROCESSING (STRONG) | 5 |
| Art6 | OIL PAINTING | 1. COLOR JUDGMENT BLOCKING PROCESSING<br>2. BINARIZATION PROCESSING<br>3. EDGE PROCESSING (STRONG) | 6 | 1. COLOR JUDGMENT BLOCKING PROCESSING<br>2. BINARIZATION PROCESSING<br>3. EDGE PROCESSING (STRONG) | 6 | 1. COLOR JUDGMENT BLOCKING PROCESSING<br>2. BINARIZATION PROCESSING<br>3. EDGE PROCESSING (STRONG) | 6 |
| Art7 | INK WASH PAINTING | 1. COLOR JUDGMENT BLOCKING PROCESSING<br>2. BINARIZATION PROCESSING<br>3. EDGE PROCESSING (WEAK) | 7 | 1. COLOR JUDGMENT BLOCKING PROCESSING<br>2. BINARIZATION PROCESSING<br>3. EDGE PROCESSING (WEAK) | 7 | 1. COLOR JUDGMENT BLOCKING PROCESSING<br>2. BINARIZATION PROCESSING<br>3. EDGE PROCESSING (WEAK) | 7 |

FIG.20

| SPECIAL EFFECT (ART FILTER) | | PROCESSING CONTENT | DEGREE OF RECOMMENDATION |
|---|---|---|---|
| Art1 | FANTASTIC FOCUS | 1. TONE CURVE PROCESSING (WEAK) | 1 |
| | | 2. BLURRING PROCESSING (STRONG) | |
| | | 3. SYNTHESIS PROCESSING | |
| Art2 | ROUGH MONO-CHROME | 1. EDGE ENHANCEMENT PROCESSING | 2 |
| | | 2. LEVEL CORRECTION OPTIMIZATION PROCESSING | |
| | | 3. NOISE PATTERN GENERATION & SYNTHESIS PROCESSING | |
| | | 4. CONTRAST PROCESSING | |
| Art3 | GENTLE SEPIA | 1. LEVEL CORRECTION OPTIMIZATION PROCESSING | 3 |
| | | 2. TONE CURVE PROCESSING | |
| | | 3. HUE/SATURATION SEPIA CONVERSION | |
| | | 4. DARK HUE ROTATION PROCESSING | |
| Art4 | POP ART | 1. HUE/SATURATION PROCESSING | 4 |
| | | 2. CONTRAST PROCESSING | |
| Art5 | UKIYO-E | 1. TONE CURVE PROCESSING | 5 |
| | | 2. CONTRAST PROCESSING | |
| | | 3. EDGE PROCESSING | |
| Art6 | OIL PAINTING | 1. COLOR JUDGMENT BLOCKING PROCESSING | 6 |
| | | 2. BINARIZATION PROCESSING | |
| | | 3. EDGE PROCESSING | |
| Art7 | INK WASH PAINTING | 1. COLOR JUDGMENT BLOCKING PROCESSING | 7 |
| | | 2. CONTRAST PROCESSING | |
| | | 3. EDGE PROCESSING | |
| Art8 | TOY PHOTO | 1. WHITE BALANCE PROCESSING | 8 |
| | | 2. BINARIZATION PROCESSING | |
| | | 3. SHADING PROCESSING | |
| Art9 | DIORAMA | 1. HUE/SATURATION PROCESSING | 9 |
| | | 2. CONTRAST PROCESSING | |
| | | 3. THREE-TIME BLURRING PROCESSING | |
| | | 4. THREE-TIME SYNTHESIS PROCESSING | | ns
IMAGING APPARATUS, IMAGING METHOD, AND COMPUTER READABLE STORAGE MEDIUM FOR APPLYING SPECIAL EFFECTS PROCESSING TO AN AUTOMATICALLY SET REGION OF A STEREOSCOPIC IMAGE

CROSS-REFERENCE TO RELATED APPLICATIONS

This application is based upon and claims the benefit of priority from Japanese Patent Application No. 2010-286548 filed on Dec. 22, 2010 and Japanese Patent Application No. 2010-293996 filed on Dec. 28, 2010, the entire contents of which are incorporated herein by reference.

BACKGROUND OF THE INVENTION

1. Field of the Invention

The present invention relates to an imaging apparatus that generates electronic image data by capturing a subject, an imaging method, and a computer readable storage medium.

2. Description of the Related Art

In recent years, technology to respond to various desires of users by producing special effects on image data, in which a subject is captured, in an imaging apparatus such as a digital camera and a digital camcorder has been known. For example, a technology to produce special effects such as a wipe and a sepia tone on image data, in which a subject is captured, and to store the image data in memory is known (see Japanese Laid-open Patent Publication No. 2005-347886). In this technology, the user can be allowed to easily select a desired special effect by causing a portion of images displayed in a display monitor to display an image on which a special effect selected when the user operates an effect switch to select the special effect is produced.

Also, a technology to perform mutually different image processing on a main subject such as a person and a flower and the background contained in a captured image is known (see Japanese Laid-open Patent Publication No. 2002-044516). In this technology, the main subject can be made to stand out from the background by performing mutually different image processing, for example, sensitivity (ISO) processing, sharpness processing, blurring processing, and color phase conversion processing.

However, only image processing of the same type with different parameters is performed on the main subject and the background in a conventional imaging apparatus. Thus, properties of the main subject are not reflected in such image processing.

SUMMARY OF THE INVENTION

An imaging apparatus according to an aspect of the present invention includes: an imaging unit that generates a pair of pieces of image data mutually having a parallax by capturing a subject; an image processing unit that performs special effect processing, which is capable of producing a visual effect by combining a plurality of pieces of image processing, on a pair of images corresponding to the pair of pieces of image data; and a region setting unit that sets a region where the image processing unit performs the special effect processing on the pair of images.

An imaging method executed by an imaging apparatus according to another aspect of the present invention includes: generating a pair of pieces of image data mutually having a parallax by capturing a subject; performing special effect processing, which is capable of producing a visual effect by combining a plurality of pieces of image processing, on a pair of images corresponding to the pair of pieces of image data; and setting a region where the special effect processing is performed on the pair of images.

A non-transitory computer-readable storage medium according to still another aspect of the present invention has an executable program stored thereon, wherein the program instructs a processor to perform: generating a pair of pieces of image data mutually having a parallax by capturing a subject; performing special effect processing, which is capable of producing a visual effect by combining a plurality of pieces of image processing, on a pair of images corresponding to the pair of pieces of image data; and setting a region where the special effect processing is performed on the pair of images.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a special effect processing information table stored in a special effect processing information storage unit of the imaging apparatus according to the first embodiment of the present invention;

FIG. 16 is a diagram illustrating an example of the special effect processing information table stored in the special effect processing information storage unit of an imaging apparatus according to a third modification of the first embodiment of the present invention;

FIG. 17 is a schematic diagram illustrating the situation when an imaging apparatus according to a fourth modification of the first embodiment of the present invention generates two pieces of image data having overlapping edge portions in the left and right direction of respective fields of view;

FIG. 19 is a diagram illustrating an example of a first special effect processing information table stored in a first special effect processing information storage unit of the imaging apparatus according to the second embodiment of the present invention;

FIG. 20 is a diagram illustrating an example of a second special effect processing information table stored in a second special effect processing information storage unit of the imaging apparatus according to the second embodiment of the present invention;

DETAILED DESCRIPTION OF THE PREFERRED EMBODIMENTS

Modes to carry out the present invention (hereinafter, referred to as the "embodiments") will be described below with reference to drawings. However, the present invention is not limited by the embodiments described below.

First Embodiment

Figure 1:
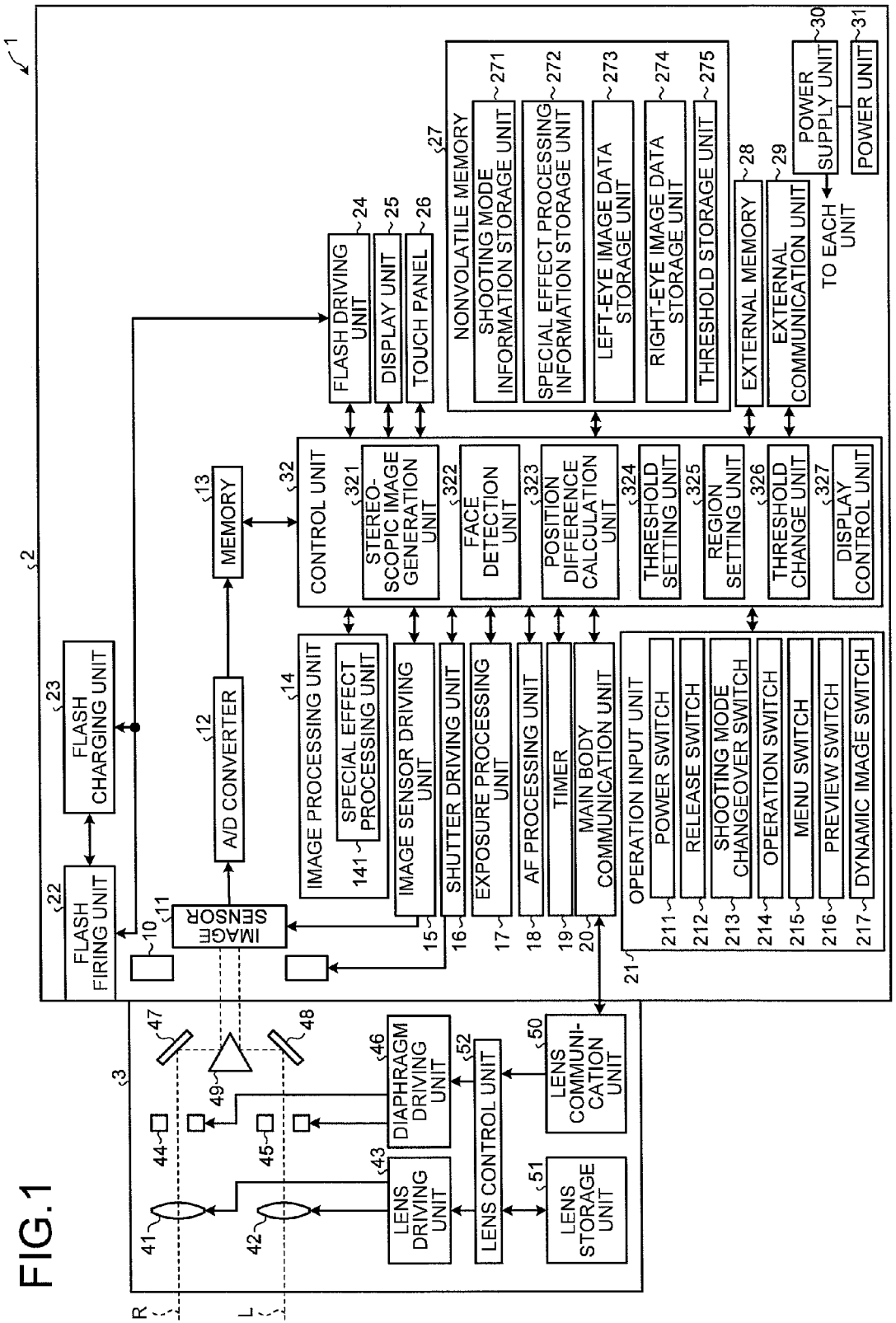
FIG. 1 is a block diagram illustrating the configuration of an imaging apparatus according to a first embodiment of the present invention.
Figure 2:
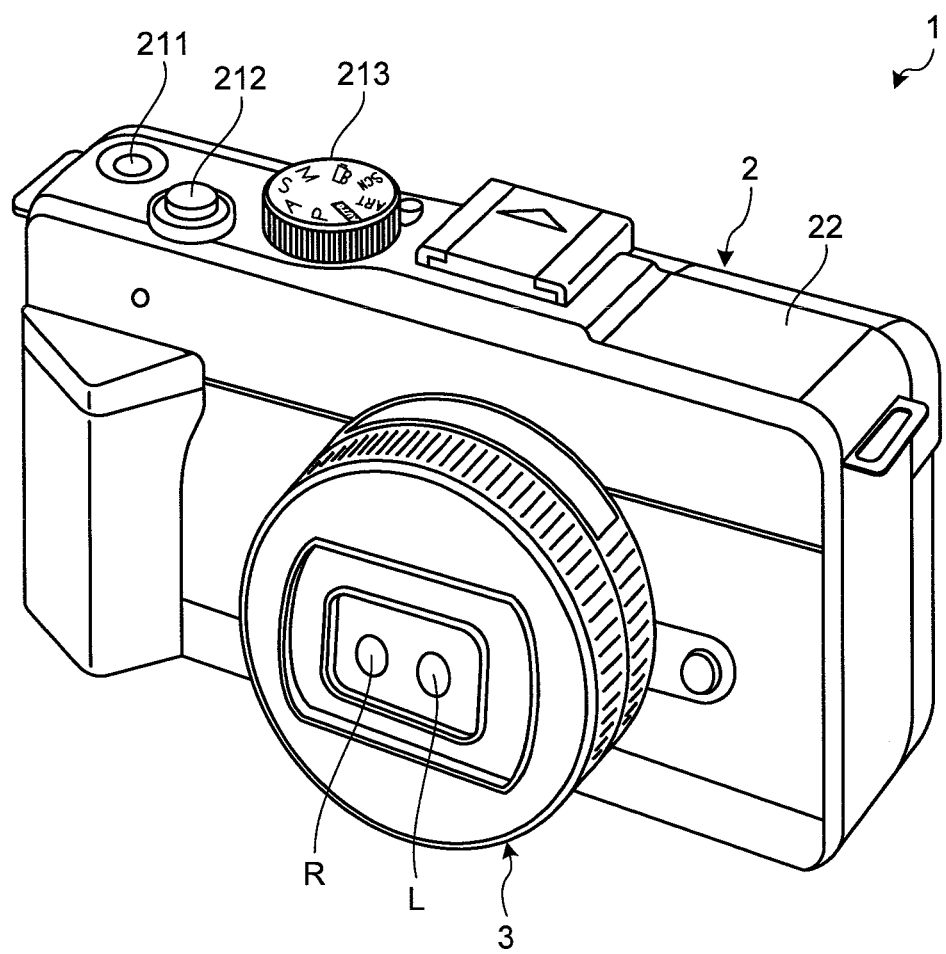
FIG. 2 is a perspective view illustrating the configuration of a side facing a subject of the imaging apparatus according to the first embodiment of the present invention.

FIG. 1 is a block diagram illustrating the configuration of an imaging apparatus according to a first embodiment of the present invention. FIG. 2 is a perspective view illustrating the configuration of a side facing a subject (front side) of the imaging apparatus according to the first embodiment of the present invention.

Figure 3:
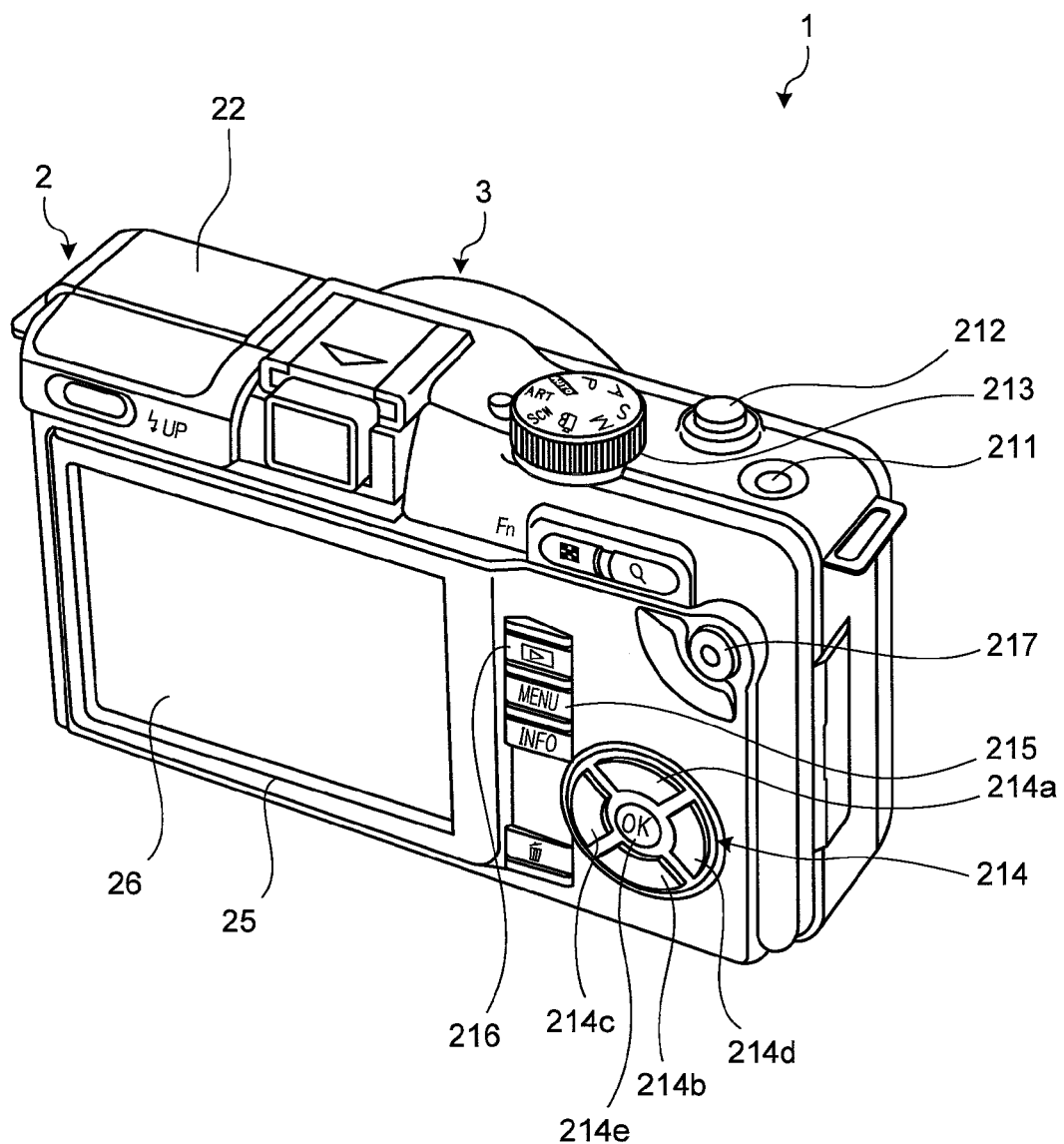
FIG. 3 is a perspective view illustrating the configuration of a side facing a photographer of the imaging apparatus according to the first embodiment of the present invention.

FIG. 3 is a perspective view illustrating the configuration of a side facing a photographer (rear side) of the imaging apparatus according to the first embodiment of the present invention. An imaging apparatus 1 illustrated in FIGS. 1 to 3 is a digital single-lens reflex camera and includes a main body unit 2 and a lens unit 3 attachable to and removable from the main body unit 2.

As illustrated in FIGS. 1 to 3, the main body unit 2 includes a shutter 10, an image sensor 11, an A/D converter 12, memory 13, an image processing unit 14, an image sensor driving unit 15, a shutter driving unit 16, an exposure processing unit 17, an AF processing unit 18, a timer 19, a main body communication unit 20, an operation input unit 21, a flash firing unit 22, a flash charging unit 23, a flash driving unit 24, a display unit 25, a touch panel 26, a nonvolatile memory 27, an external memory 28, an external communication unit 29, a power supply unit 30, a power unit 31, and a control unit 32.

The shutter 10 sets the state of the image sensor 11 to an exposed state or a light blocked state. The shutter driving unit 16 is configured by using a stepping motor or the like and drives the shutter 10 in accordance with a release signal.

The image sensor 11 is configured by using a CCD (Charge Coupled Device) or CMOS (Complementary Metal Oxide Semiconductor) that receives and converts light condensed by the lens unit 3 into an electric signal. The image sensor driving unit 15 causes the image sensor 11 to output image data (analog signal) to the A/D converter 12 in predetermined timing.

The A/D converter 12 generates digital image data by making an A/D conversion of an analog signal input from the image sensor 11 and outputs the image data to the memory 13.

The memory 13 is configured by using SDRAM (Synchronous Dynamic Random Access Memory). The memory 13 temporarily records image data input from the A/D converter 12 or information being processed in the imaging apparatus 1. More specifically, the memory 13 temporarily records image data sequentially output by the image sensor 11 in each frame.

The image processing unit 14 acquires image data recorded in the memory 13 and performs various kinds of image processing on the acquired image data before outputting the image data to the memory 13. More specifically, the image processing unit 14 performs normal image processing containing at least edge enhancement, white balance, color corrections, and γ corrections on image data. The image processing unit 14 includes a special effect processing unit 141.

The special effect processing unit 141 performs special effect processing that causes a visual effect by combining a plurality of pieces of image processing on image data. As the special effect processing, for example, processing combining tone curve processing, blurring processing, and image synthesis processing is performed.

The exposure processing unit 17 performs automatic exposure of the imaging apparatus 1 by deciding conditions for still image shooting or dynamic image shooting, for example, the F number setting, shutter speed or the like based on image data recorded in the memory 13 via the control unit 32.

The AF processing unit 18 adjusts an auto focus of the imaging apparatus 1 based on image data recorded in the memory 13 via the control unit 32. For example, the AF processing unit 18 drives the lens unit 3 so that sharpness of a subject image to be captured becomes maximum based on the contrast of image data.

The timer 19 clocks the time. The timer 19 has a determination function of the shooting date/time. The timer 19 outputs date/time data to the control unit 32 to add the date/time data to shot image data.

The main body communication unit 20 is a communication interface to perform communication with the lens unit 3 mounted on the main body unit 2. Incidentally, the main body communication unit 20 may allow power supplied from the power unit 31 provided in the main body unit 2 to the lens unit 3.

The operation input unit 21 includes a power switch 211 that switches the state of power of the imaging apparatus 1 between the on state and the off state, a release switch 212 that inputs a release signal instructing shooting, a shooting mode changeover switch 213 that inputs a switching signal instructing switching of various shooting modes set to the imaging apparatus 1, an operation switch 214 that inputs an instruction signal instructing a selection or decision of various settings of the imaging apparatus 1, a menu switch 215 that inputs an instruction signal instructing a display of an operation menu screen set to the imaging apparatus 1, a preview switch 216 that inputs an instruction signal instructing a preview display of captured image data, and a dynamic image switch 217 that inputs a dynamic image release signal instructing dynamic image shooting. The operation switch 214 includes direction buttons 214a to 214d of each of up and down, left and right to make selections and settings in the menu screen and the like and a decision button 214e (OK button) to decide an operation by the direction buttons 214a to 214d in the menu screen and the like (see FIG. 3). Incidentally, the operation switch 214 may be configured by using a dial switch or the like.

The flash firing unit 22 is configured by using a xenon lamp or LED (Light Emitting Diode). The flash firing unit 22 fires a flash of light as a fill flash toward a region of the field of view to be captured by the imaging apparatus 1. The flash charging unit 23 charges by receiving a power supply from the power unit 31 to boost the voltage. The flash driving unit 24 drives the flash firing unit 22 by applying the voltage boosted by the flash charging unit 23 to the flash firing unit 22.

Figure 4:
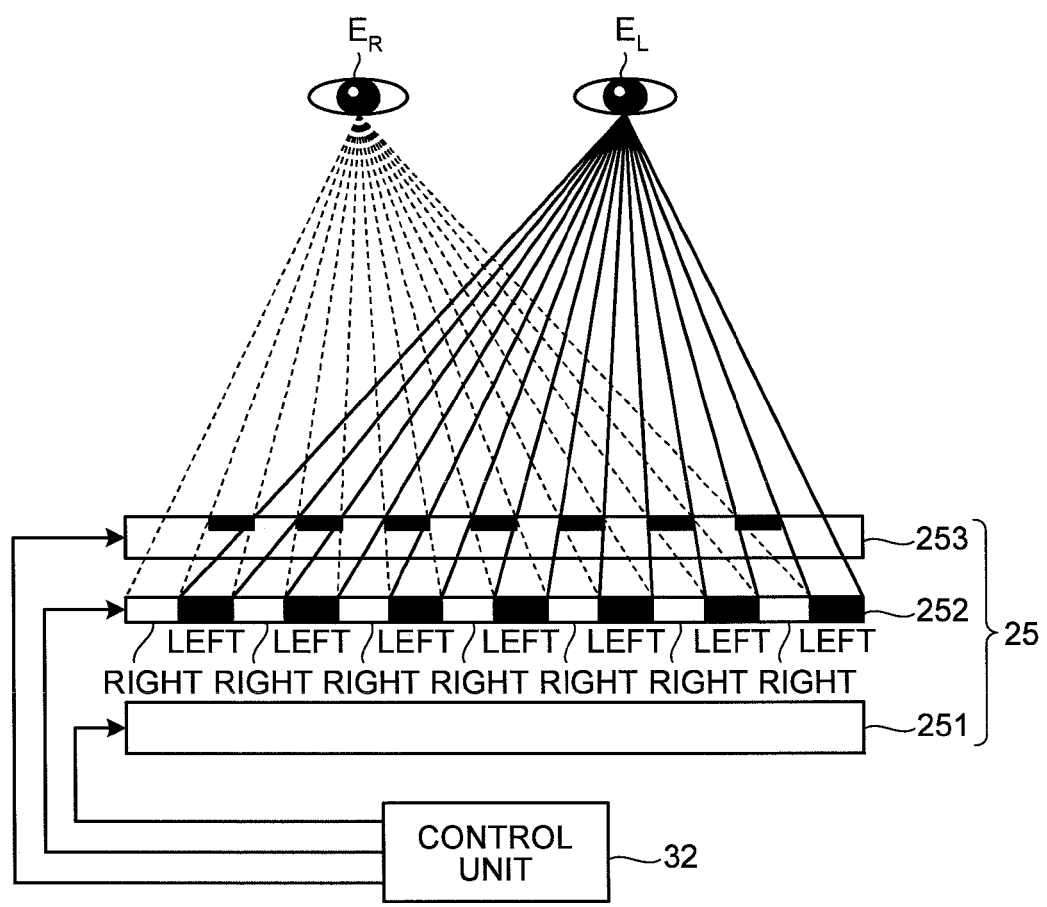
FIG. 4 is a schematic diagram illustrating an outline configuration of a display unit of the imaging apparatus according to the first embodiment of the present invention.

FIG. 4 is a schematic diagram illustrating an outline configuration of the display unit 25. As illustrated in FIG. 4, the display unit 25 includes a backlight 251, a display panel 252, and a parallax barrier 253. The backlight 251 is configured by an LED (Light Emitting Diode) or the like and shines light to display images from behind the panel. The display panel 252 is configured by a display panel such as the liquid crystal and organic EL (Electro Luminescence). The parallax barrier 253 is configured by the liquid crystal or the like and laminated on the top surface of the display panel 252. The parallax barrier 253 has slits provided at intervals narrower than intervals of each image of the display panel 252 and separates images corresponding to the right eye $E_R$ and the left eye $E_L$. For example, a parallax barrier method is applied as the parallax barrier 253. Instead of the parallax barrier 253, a lenticular method by which a lens sheet in which a lenticular lens is laminated is laminated on the top surface of the display panel 252 may be applied.

In the display unit 25 having the above configuration, when three-dimensional image (hereinafter, referred to as a "3D image") data is input from the control unit 32, the display panel 252 displays a left-eye image and a right-eye image alternately starting with the leftmost image in the horizontal direction under the control of the control unit 32 and the parallax barrier 253 separates light emitted from each image of the display panel 252. Thus, left-eye images reach the left eye $E_L$ only and right-eye images reach the right eye $E_R$ only. Accordingly, the user can view 3D images displayed by the display unit 25 stereoscopically. When the display unit 25 switches the display mode from 3D images to two-dimensional images (hereinafter, referred to as "2D images"), the parallax barrier 253 changes from a light blocked state to a transparent state by the voltage applied to the parallax barrier 253 being changed from the on state to the off state so that one of left-eye image data and right-eye image data is output to the display panel 252.

The touch panel 26 is provided on top of the display screen of the display unit 25 (see FIG. 3). The touch panel 26 detects the position touched by the user based on information displayed in the display unit 25 and accepts input of an operation signal in accordance with the touch position. Touch panels generally include the resistance film type, the electric capacitance type, and the optical type. In the present embodiment, any type of touch panel is applicable. In the present embodiment, the touch panel 26 functions as an input unit.

The nonvolatile memory 27 is configured by using flash memory. The nonvolatile memory 27 stores various programs to cause the imaging apparatus 1 to operate, imaging programs according to the present embodiment, and various kinds of data and parameters used during execution of programs. The nonvolatile memory 27 includes a shooting mode information storage unit 271 that stores information about various shooting modes executed by the imaging apparatus 1, a special effect processing information storage unit 272 that stores information about special effect processing performed by the image processing unit 14, a left-eye image data storage unit 273 that stores left-eye image data used when the display unit 25 is caused to display 3D images, a right-eye image data storage unit 274 that stores right-eye image data used when the display unit 25 is caused to display 3D images, and a threshold storage unit 275 that stores a threshold to isolate a subject region and a background region contained in each of captured left-eye images and right-eye images. Incidentally, the nonvolatile memory 27 may store lens specific information in accordance with the type of the lens unit 3 that can be mounted on the main body unit 2.

A special effect processing information table stored in the special effect processing information storage unit 272 will be described. FIG. 5 is a diagram illustrating an example of the special effect processing information table stored in the special effect processing information storage unit 272.

As illustrated in FIG. 5, a special effect processing information table T1 has content of special effect processing that can be performed by the special effect processing unit 141 on image data stored in the memory 13 and image processing in each piece of the special effect processing described therein. If, for example, the special effect processing is "Fantastic focus" of "Art1", "Tone curve processing", "Blurring processing", and "Synthesis processing" are described as processing content of the image processing. The synthesis processing is image processing that generates image data by synthesizing image data obtained after tone curve processing being performed by the special effect processing unit 141 and image data obtained after blurring processing being performed by the special effect processing unit 141. Further, if the special effect processing is "Pop art" of "Art4", "Hue/ saturation processing", and "Contrast processing" are described as processing content of the image processing.

The external memory 28 is configured by using a storage medium such as a memory card inserted from outside the imaging apparatus 1. The external memory 28 stores information about 3D image data and 2D image data by being inserted into the imaging apparatus 1 via a storage medium interface (not illustrated) and also outputs various kinds of information stored therein to the display unit 25, the image processing unit 14, and the nonvolatile memory 27 under the control of the control unit 32.

The external communication unit 29 has a function as a communication interface and transmits/receives data to/from external processing apparatuses such as servers (not illustrated) and personal computers (not illustrated) via a network (not illustrated) in both directions. The external communication unit 29 acquires various programs of the imaging apparatus 1 and data on special effect processing information by transmitting/receiving data to/from external processing apparatuses and outputs the acquired programs and data to the control unit 32. Incidentally, the external communication unit 29 is connected to a network by wire or wireless LAN (Local Area Network) or the like.

The power supply unit 30 supplies power of the power unit 31 to each structural element of the imaging apparatus 1. The power unit 31 is configured by using batteries attachable to and removable from the imaging apparatus 1. Incidentally, the power supply unit 30 may supply power supplied from an external power supply (not illustrated) to each structural element of the imaging apparatus 1.

The control unit 32 is configured by using a CPU (Central Processing Unit) or the like. The control unit 32 controls the operation of the imaging apparatus 1 in a unified manner by reading and executing programs from the nonvolatile memory 27 in accordance with an operation signal or instruction signal from the operation input unit 21 and transferring instructions or data corresponding to each unit constituting the imaging apparatus 1. The control unit 32 includes a stereoscopic image generation unit 321, a face detection unit 322, a position difference calculation unit 323, a threshold setting unit 324, a region setting unit 325, a threshold change unit 326, and a display control unit 327.

The stereoscopic image generation unit 321 acquires image data image-processed by the image processing unit 14 from the memory 13 to generate 3D image data by using the acquired image data. More specifically, the stereoscopic image generation unit 321 divides the image data acquired from the memory 13 into left-eye image data and right-eye image data and cuts out the divided left-eye image data and right-eye image data in a predetermined length-to-width ratio (for example, an aspect ratio 9:16) to generate 3D image data. The stereoscopic image generation unit 321 causes the left-eye image data storage unit 273 and the right-eye image data storage unit 274 to store the left-eye image data and right-eye image data, respectively. Incidentally, the length-to-width ratio in which the left-eye image data and right-eye image data divided by the stereoscopic image generation unit 321 may be made changeable from the operation input unit 21.

The face detection unit 322 detects the face of a person contained in one of a left-eye image corresponding to left-eye image data and a right-eye image corresponding to right-eye image data by pattern matching. For example, the face detection unit 322 detects the face of a person contained in a left-eye image by pattern matching. Incidentally, the face detection unit 322 may also detect, in addition to the face of a person, the face of an animal such as a cat and dog.

The position difference calculation unit 323 calculates a position difference of a subject contained in images corresponding to each of a pair of pieces of image data. More specifically, the position difference calculation unit 323 correlatively compares positions of a subject contained in each of a left-eye image and a right-eye image to calculate a position difference of a subject in the left-eye image and the right-eye image. The position difference of a subject is a difference in position in the left and right direction of an image contained in the left-eye image and right-eye image when the left-eye and right-eye images are superimposed. For example, the position difference is a difference in position of a face image when frames of the left and right images are superimposed or a difference in position of the background when frames of the left and right images are superimposed. The position difference calculation unit 323 may determine whether positions of a face image are different or positions of the background are different when frames of the left and right images are superimposed. Further, the position difference calculation unit 323 may determine whether there is any difference in position of the background when face images contained in the left and right images are superimposed or whether there is any difference in position of faces in the left and right direction when the face images are compared by matching the background contained in the left and right images.

The threshold setting unit 324 sets the threshold that isolates a subject region (short-range subject region) and a background region (long-range subject region) other than the subject region contained in the left-eye image and right-eye image in accordance with the position difference calculated by the position difference calculation unit 323. For example, the threshold setting unit 324 sets the threshold that isolates a subject region and a background region in accordance with the maximum value of the position difference calculated by the position difference calculation unit 323. The threshold setting unit 324 outputs information about the set threshold to the threshold storage unit 275. Incidentally, the threshold setting unit 324 may calculate a subject distance from the imaging apparatus 1 to the subject by using the well-known triangulation based on the left-eye image and right-eye image to set the threshold in accordance with the calculated subject distance.

The region setting unit 325 sets a region where special effect processing is performed by the image processing unit 14 on a pair of images based on a position difference calculated by the position difference calculation unit 323. More specifically, the region setting unit 325 sets a region where special effect processing is performed by the special effect processing unit 141 on each of a left-eye image and a right-eye image based on a position difference calculated by the position difference calculation unit 323. Further, the region setting unit 325 sets a region where the position difference calculated by the position difference calculation unit 323 exceeds the threshold as a region where the image processing unit 14 performs the special effect processing and sets a region where the position difference is equal to or less than the thresholds as a region where the image processing unit 14 performs normal image processing.

The threshold change unit 326 changes the threshold set by the threshold setting unit 324. For example, the threshold change unit 326 changes the threshold set by the threshold setting unit 324 in accordance with an operation signal input from the operation input unit 21 or the touch panel 26.

The display control unit 327 changes the display mode of the display unit 25. More specifically, the display control unit 327 exercises control to switch an image displayed in the display unit 25 to a 2D image or 3D image. When the display unit 25 displays a 2D image, the display control unit 327 causes the display unit 25 to display icons about special effect processing information performed by the special effect processing unit 141.

The lens unit 3 includes a first optical system 41, a second optical system 42, a lens driving unit 43, a diaphragm 44, a diaphragm 45, a diaphragm driving unit 46, a mirror 47, a mirror 48, a prism 49, a lens communication unit 50, a lens storage unit 51, and a lens control unit 52. Incidentally, the lens unit 3 is an interchangeable lens that can capture a 3D image by capturing a subject with a parallax by a pair of optical systems and forming left and right subject images in the image sensor 11. Thus, the first optical system 41 and the second optical system 42 have the same configuration and only one of the optical systems will be described.

The first optical system 41 is configured by using one lens or a plurality of lenses. The first optical system 41 condenses light from a region of a predetermined field of view. Incidentally, the first optical system 41 may have an optical zoom function that changes an image.

The lens driving unit 43 is configured by using a DC motor or the like. The lens driving unit 43 changes the focusing position, focal length and the like of each of the first optical system 41 and the second optical system 42 by synchronously moving lenses of the first optical system 41 and the second optical system 42 on an optical axis L and an optical axis R, respectively.

The diaphragm 44 and the diaphragm 45 adjust the exposure by limiting the amount of incident light condensed by the first optical system 41 and the second optical system 42, respectively.

The diaphragm driving unit 46 is configured by using a stepping motor or the like. The diaphragm driving unit 46 synchronously drives the diaphragm 44 and the diaphragm 45.

The mirror 47 and the mirror 48 reflect light condensed by the first optical system 41 and the second optical system 42 toward the prism 49, respectively.

The prism 49 reflects light reflected by each of the mirror 47 and the mirror 48 toward the image sensor 11. Accordingly, a pair of left and right subject images condensed by the first optical system 41 and the second optical system 42, respectively, is formed in the image sensor 11.

The lens communication unit 50 is a communication interface to perform communication with the main body unit 2 in both directions when the lens unit 3 is mounted on the main body unit 2.

The lens storage unit 51 is configured by using flash memory. The lens storage unit 51 stores various programs to operate the lens unit 3 and various kinds of data and parameters used during execution of programs.

The lens control unit 52 is configured by using a CPU (Central Processing Unit) or the like. The lens control unit 52 controls the operation of the lens unit 3 in accordance with an instruction signal from the main body unit 2. More specifically, the lens control unit 52 drives the lens driving unit 43 in accordance with an instruction signal from the main body unit 2 to focus the lens unit 3 and also drives the diaphragm driving unit 46 to change the F number. Incidentally, when the lens unit 3 is mounted on the main body unit 2, the lens control unit 52 may send focusing position information and focal length information of the lens unit 3 and specific information identifying the lens unit 3 to the main body unit 2. In the present embodiment, the configuration including the lens unit 3, the image sensor 11, and the A/D converter 12 functions as an imaging unit (hereinafter, referred to as an "imaging unit 100").

Figure 6:
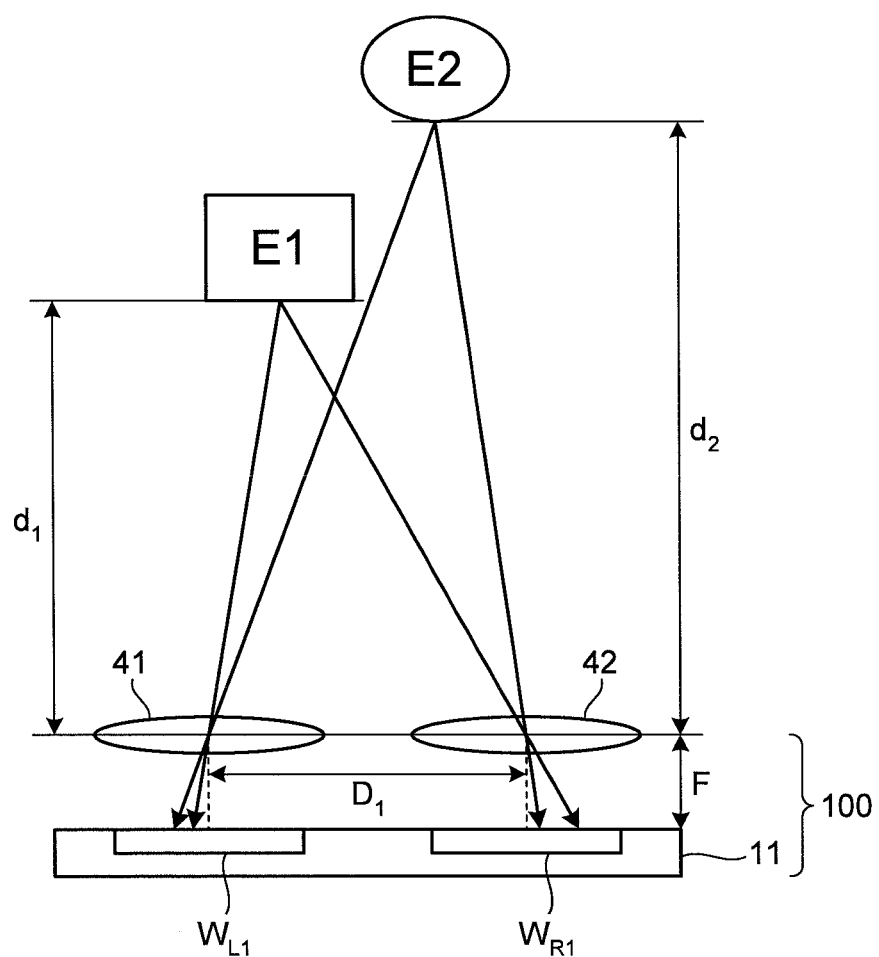
FIG. 6 is a schematic diagram illustrating a situation when an imaging unit of the imaging apparatus according to the first embodiment of the present invention generates two pieces of image data having overlapping edge portions in a left and right direction of respective fields of view.

The situation when the imaging unit 100 generates two pieces of image data having overlapping edge portions in the left and right direction of respective fields of view in the imaging apparatus 1 having the above configuration will be described. FIG. 6 is a schematic diagram illustrating a situation when the imaging unit 100 generates two pieces of image data having overlapping edge portions in the left and right direction of respective fields of view. As illustrated in FIG. 6, the imaging unit 100 generates left-eye image data and right-eye image data by capturing a subject E1 (distance $d_1$) and a subject E2 (distance $d_2$) having different distances from the first optical system 41 and the second optical system 42 by the first optical system 41 and the second optical system 42 provided side by side with a distance $D_1$ therebetween.

Then, the stereoscopic image generation unit 321 divides image data generated by the image sensor 11 into left-eye image data and right-eye image data and generates a left-eye image $W_{L1}$ and a right-eye image $W_{R1}$ by cutting out the divided left-eye image data and right-eye image data in a predetermined length-to-width ratio.

Figure 7:
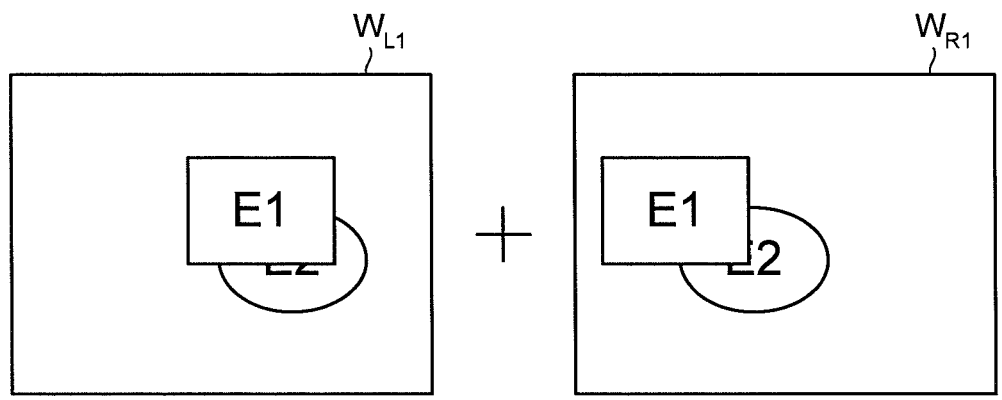
FIG. 7 is a diagram illustrating an example of two images corresponding to the two pieces of image data generated by a stereoscopic image generation unit of the imaging apparatus in the situation illustrated in FIG. 6.
Figure 8:
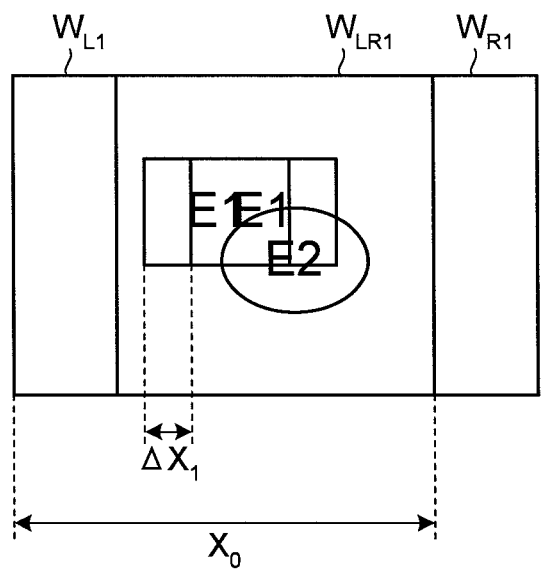
FIG. 8 is a diagram illustrating an example of an image obtained by virtually superimposing a left-eye image and a right-eye image generated by the stereoscopic image generation unit of the imaging apparatus in the situation illustrated in FIG. 6.
Figure 9:
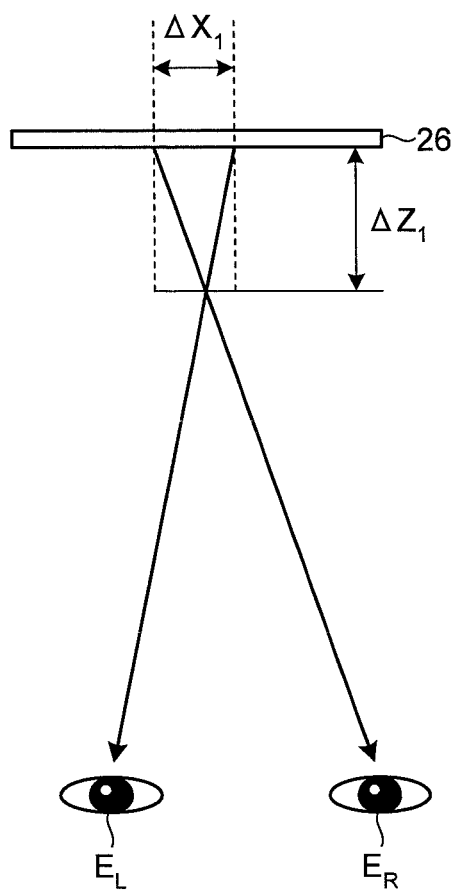
FIG. 9 is a diagram illustrating a protrusion distance of a 3D image virtually recognized by a user when the left-eye image and the right-eye image generated by the stereoscopic image generation unit of the imaging apparatus are displayed in a display unit in the situation illustrated in FIG. 6.

FIG. 7 is a diagram illustrating an example of two images corresponding to two pieces of image data generated by the stereoscopic image generation unit 321 in the situation illustrated in FIG. 6. In FIG. 7, the left-eye image $W_{L1}$ is an image generated by an image corresponding to left-eye image data generated by the first optical system 41 being cut out by the stereoscopic image generation unit 321. Also in FIG. 7, the right-eye image $W_{R1}$ is an image generated by an image corresponding to right-eye image data generated by the second optical system 42 being cut out by the stereoscopic image generation unit 321. FIG. 8 is a diagram illustrating an example of an image obtained by virtually superimposing the left-eye image $W_{L1}$ and the right-eye image $W_{R1}$ generated by the stereoscopic image generation unit 321 in the situation illustrated in FIG. 6. FIG. 9 is a diagram illustrating a protrusion distance of a 3D image virtually recognized by the user when the left-eye image $W_{L1}$ and the right-eye image $W_{R1}$ generated by the stereoscopic image generation unit 321 are displayed in the display unit 25 in the situation illustrated in FIG. 6.

As illustrated in FIG. 7, the stereoscopic image generation unit 321 generates the left-eye image $W_{L1}$ and the right-eye image $W_{R1}$ in which positions of the subjects E1, E2 are shifted laterally due to a parallax between the first optical system 41 and the second optical system 42.

Subsequently, the display control unit 327 causes the display unit 25 to superimpose and display the subject E2 of the left-eye image $W_{L1}$ and the subject E2 of the left-eye image $W_{R1}$ (see FIG. 8). Accordingly, a stereoscopic 3D image in which the subject E1 protrudes from the display panel 252 by $\Delta Z_1$ in accordance with a shift amount $\Delta X_1$ caused by the parallax of the subject E2 can virtually be recognized (see FIG. 9).

Next, the setting method of the special effect (art filter shooting mode) in which the imaging apparatus 1 performs special effect processing will be described. Incidentally, the imaging apparatus 1 according to the present embodiment has a plurality of shooting modes such as the shooting scene automatic judgment mode and manual shooting mode, but the setting method of only the special effect shooting mode will be described below.

First, when the imaging apparatus 1 is activated by the power switch 211 being operated by the user, the control unit 32 judges whether the shooting mode of the imaging apparatus 1 is set to the special effect shooting mode. More specifically, the control unit 32 judges whether the shooting mode changeover switch 213 is set to the special effect shooting mode (ART) (see FIGS. 2 and 3). If the shooting mode of the imaging apparatus 1 is not set to the special effect shooting mode, the control unit 32 causes the display unit 25 to display an operation menu screen or a live view image corresponding to the other shooting mode.

If the shooting mode of the imaging apparatus 1 is set to the special effect shooting mode, on the other hand, the display control unit 327 causes the display unit 25 to display a special effect shooting operation menu screen corresponding to the special effect shooting mode.

Figure 10:
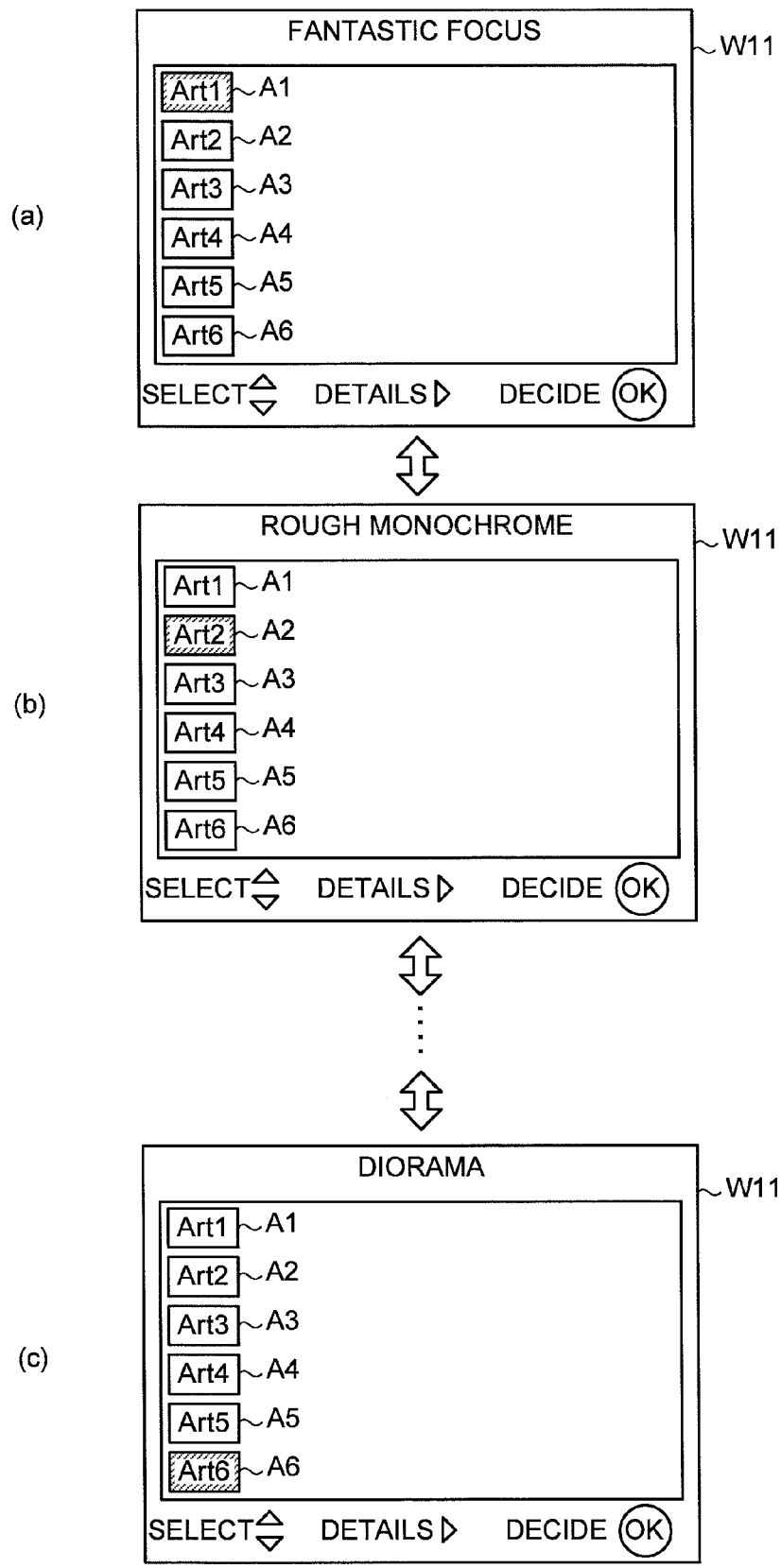
FIG. 10 is a diagram illustrating an example of a screen transition of a special effect shooting operation menu in special effect shooting mode displayed by the display unit when the imaging apparatus according to the first embodiment of the present invention is set to the special effect shooting mode.

FIG. 10 is a diagram illustrating an example of the screen transition of the special effect shooting operation menu in special effect shooting mode displayed by the display unit 25 when the imaging apparatus 1 is set to the special effect shooting mode.

As illustrated in FIG. 10, if the imaging apparatus 1 is set to the special effect shooting mode, the display control unit 327 causes the display unit 25 to display a special effect shooting operation menu screen W11 (see FIG. 10(a)). In the special effect shooting operation menu screen W11, information about each piece of special effect processing that can be performed by the imaging apparatus 1 is displayed as icons A1 to A6.

Subsequently, when the user operates an up button 214a or a down button 214b of the operation switch 214, the display control unit 327 causes the display unit 25 to switch content of the special effect shooting operation menu screen W11 displayed by the display unit 25 in accordance with an operation signal input from the operation switch 214. More specifically, the display control unit 327 changes the color of the icons A1 to A6 displayed in the special effect shooting operation menu screen W11 in accordance with an operation signal input from the operation switch 214 and causes the display unit 25 to display the title of the special effect processing corresponding to the selected icon, for example, "Fantastic focus", "Rough monochrome", or "Diorama" (FIG. 10(a)→FIG. 10(b) →FIG. 10(c)). Accordingly, the user can select the desired special effect processing and can also recognize the selected special effect processing intuitively.

Then, the control unit 32 sets the special effect processing currently displayed in the special effect shooting operation menu screen W11 by the display unit 25 when the decision button 214e of the operation switch 214 is operated by the user, for example, "Fantastic focus" (see FIG. 10(a)) to the imaging apparatus 1 as the special effect processing in special effect shooting mode. Incidentally, information about the set special effect processing is stored in the memory 13.

Subsequently, the display control unit 327 causes the display unit 25 to display a live view image corresponding to image data obtained after the special effect processing selected in the special effect shooting operation menu screen W11 being performed by the image processing unit 14 thereon. Accordingly, the user can decide the composition of shooting while checking a live view image obtained by performing the selected special effect processing on captured image data in real time.

Figure 11:
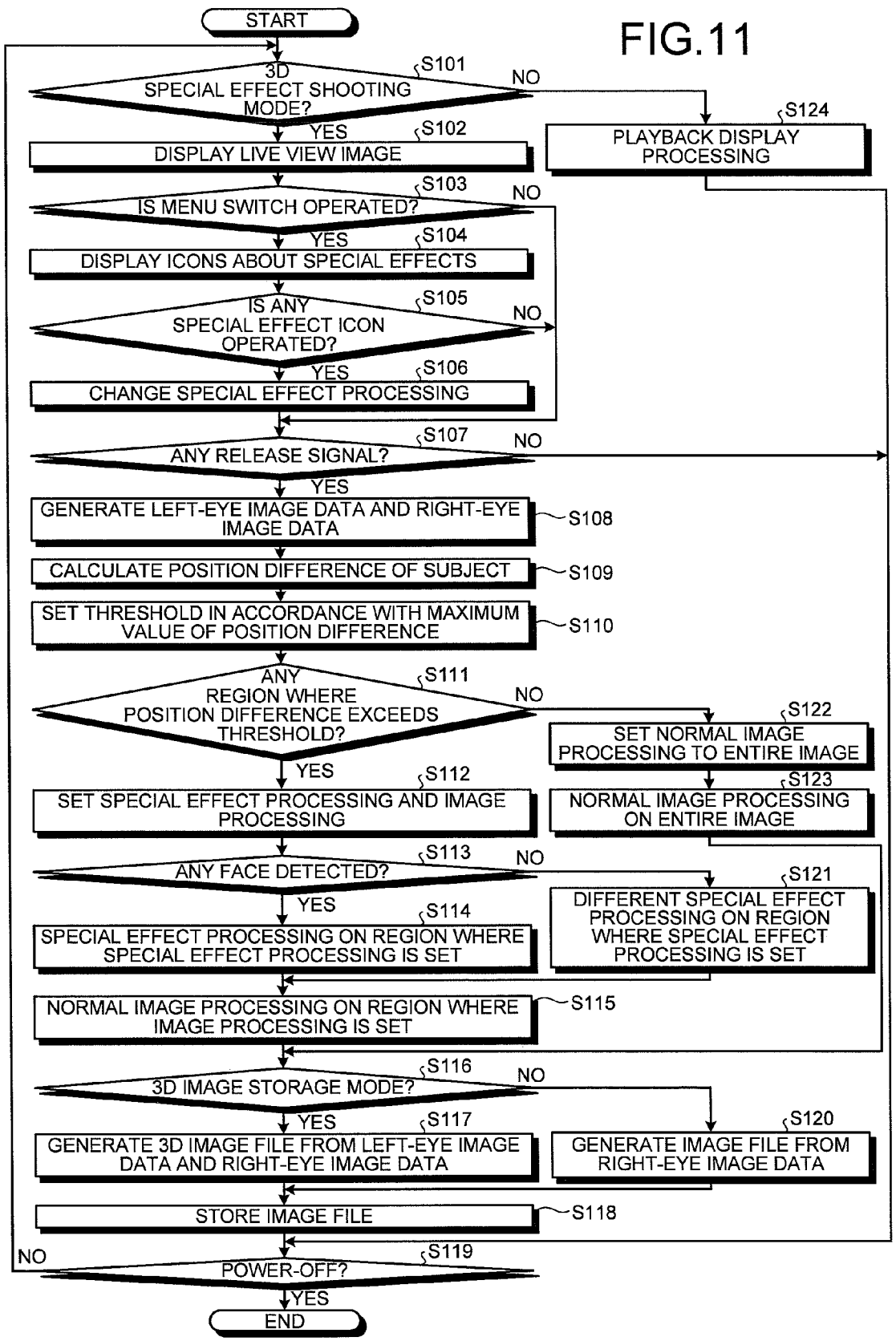
FIG. 11 is a flow chart illustrating an overview of processing performed by the imaging apparatus according to the first embodiment of the present invention.

Next, processing performed by the imaging apparatus 1 according to the present embodiment will be described. FIG. 11 is a flow chart illustrating an overview of processing performed by the imaging apparatus 1.

As illustrated in FIG. 11, the control unit 32 first judges whether the imaging apparatus 1 is in 3D special effect shooting mode (step S101). If the imaging apparatus 1 is in 3D special effect shooting mode (step S101: Yes), the imaging apparatus 1 proceeds to step S102 described later. On the other hand, if the imaging apparatus 1 is not set to the 3D special effect shooting mode (step S101: No), the imaging apparatus 1 proceeds to playback display processing in step S124 described later.

A case when, in step S101, the imaging apparatus 1 is set to the 3D special effect shooting mode (step S101: Yes) will be described. In this case, the display control unit 327 causes the display unit 25 to display a live view image of a 3D image corresponding to a pair of pieces of image data generated successively at fixed minute intervals by the imaging unit 100 (step S102). More specifically, the display control unit 327 causes the display unit 25 to display a live view image of a 3D image generated by left-eye image data and right-eye image data being isolated by the stereoscopic image generation unit 321 from a pair of pieces of image data generated by the imaging unit 100.

Figure 12:
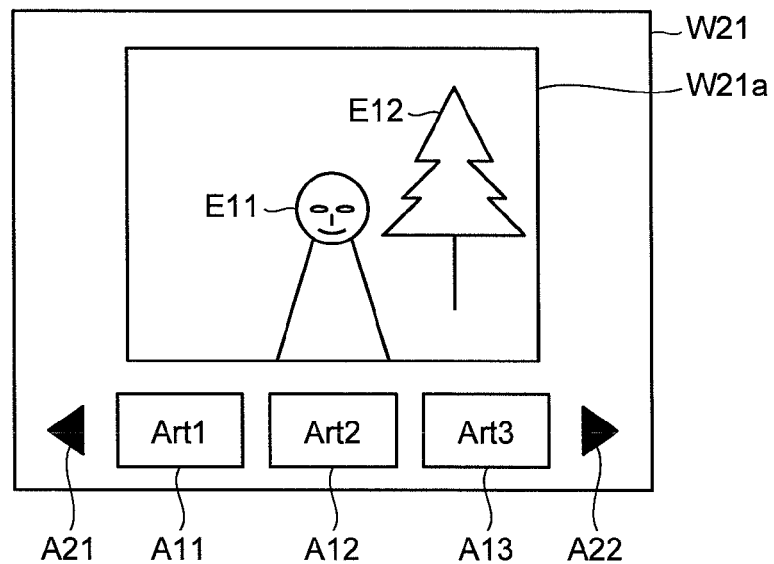
FIG. 12 is a diagram illustrating an example of the image displayed by the display unit of the imaging apparatus according to the first embodiment of the present invention.

If the menu switch 215 is operated when the display unit 25 displays a live view image (step S103: Yes), the display control unit 327 switches the display mode of the live view image displayed by the display unit 25 from the 3D image to the 2D image and causes the display unit 25 to display icons about special effect processing (step S104). More specifically, as illustrated in FIG. 12, the display control unit 327 causes the display unit 25 to display a live view image W21a, special effect icons A11 to A13 about special effects, and switching icons A21, A22 that receives a switching instruction of the special effect icons on a display screen W21 of the display unit 25. At this point, the display control unit 327 may cause the display unit 25 to display the live view image W21a as a 3D image.

Subsequently, if a special effect icon displayed by the display unit 25 is operated (step S105: Yes), the control unit 32 changes the special effect processing set to the imaging apparatus 1 to the special effect processing corresponding to the special effect icon (step S106) and the imaging apparatus 1 proceeds to step S107.

If the release switch 212 is operated and a release signal instructing shooting is input (step S107: Yes), the imaging unit 100 generates left-eye image data and right-eye image data and outputs the generated left-eye image data and right-eye image data to the memory 13 (step S108).

Subsequently, the position difference calculation unit 323 acquires the left-eye image data and right-eye image data from the memory 13 and calculates a position difference of subjects contained in a left-eye image and a right-eye image corresponding to the acquired left-eye image data and right-eye image data, respectively (step S109), and the threshold setting unit 324 sets the threshold that isolates a subject region and a background region contained in each of the left-eye image and the right-eye image in accordance with the maximum value of the position difference of subjects calculated by the position difference calculation unit 323 (step S110).

Figure 13:
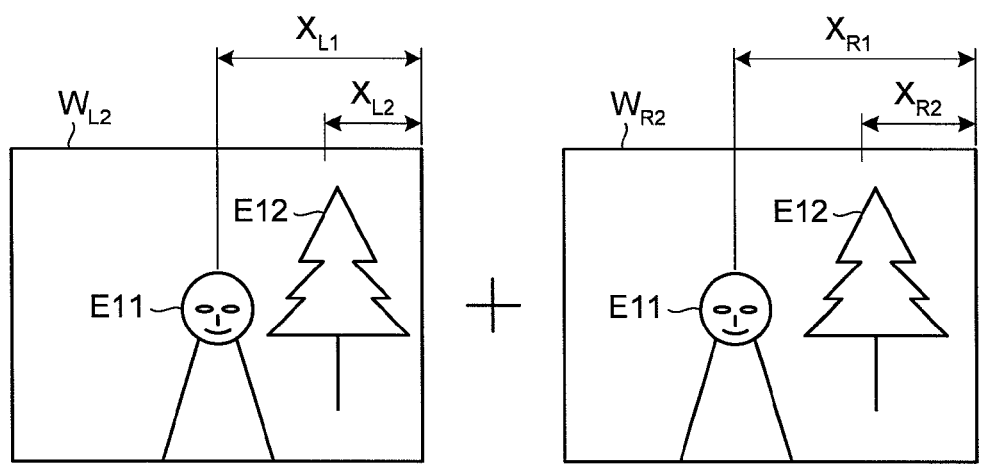
FIG. 13 is a diagram illustrating an overview of processing performed by a position difference calculation unit of the imaging apparatus according to the first embodiment of the present invention.

FIG. 13 is a diagram illustrating an overview of processing performed by the position difference calculation unit 323. In FIG. 13, a subject E11 is positioned closer to the imaging apparatus 1 (short-range side) than a subject E12.

In the situation illustrated in FIG. 13, the position difference calculation unit 323 compares positions of the subject E11 contained in each of a left-eye image $W_{L2}$ and a right-eye image $W_{R2}$ to calculate a position difference of the subject E11 in the left-eye image $W_{L2}$ and the right-eye image $W_{R2}$. For example, if the distance from the right edge of the left-eye image $W_{L2}$ to the center position of the subject E11 contained in the left-eye image $W_{L2}$ is the distance from the right edge of the right-eye image $W_{R2}$ to the center position of the subject E11 contained in the right-eye image $W_{R2}$ is $X_{R1}$, and the position difference of the subject E11 contained in each of the left-eye image $W_{L2}$ and the right-eye image $W_{R2}$ is $\Delta X_1$, $\Delta X_1$ is given by $\Delta X_1 = X_{R1} - X_{L1}$.

Further, if the distance from the right edge of the left-eye image $W_{L2}$ to the center position of the subject E12 contained in the left-eye image $W_{L2}$ is $X_{L2}$, the distance from the right edge of the right-eye image $W_{R2}$ to the center position of the subject E12 contained in the right-eye image $W_{R2}$ is $X_{R2}$, and the position difference of the subject E12 contained in each of the left-eye image $W_{L2}$ and the right-eye image $W_{R2}$ is $\Delta X_2$, $\Delta X_2$ is given by $\Delta X_2 = X_{R2} - X_{L2}$. Because the subject E11 is positioned closer to the imaging apparatus 1 than the subject E12, the position difference $\Delta X_1$ of the subject E11 is larger than the position difference $\Delta X_2$ of the subject E12.

Thus, the position difference calculation unit 323 compares positions of a subject contained in each of the left-eye image $W_{L2}$ and the right-eye image $W_{R2}$ to correlatingly calculate a position difference of the subject in the left-eye image $W_{L2}$ and the right-eye image $W_{R2}$. Further, the threshold setting unit 324 sets the threshold that isolates a subject region and a background region in accordance with the maximum value of the position difference calculated by the position difference calculation unit 323. For example, in the situation illustrated in FIG. 13, if the subject distance from the subject E11 to the imaging apparatus 1 is more than 0.6 m, the threshold setting unit 324 sets a region where the position difference of the subject is more than 1/100 as a subject region. Thus, the threshold setting unit 324 sets a value smaller than the position difference $\Delta X_1$ as the threshold.

Returning to FIG. 11, the description of step S110 and thereafter will continue. In step S111, the control unit 32 judges whether a region where the position difference of a subject calculated by the position difference calculation unit 323 exceeds the threshold is present in each of the left-eye image $W_{L2}$ and the right-eye image $W_{R2}$. If a region where the position difference of a subject exceeds the threshold is present in each of the left-eye image $W_{L2}$ and the right-eye image $W_{R2}$ (step S111: Yes), the imaging apparatus 1 proceeds to step S112.

Subsequently, the region setting unit 325 sets a region where the position difference exceeds the threshold as a region where the image processing unit 14 performs the special effect processing settings and sets a region where the position difference is equal to or less than the thresholds as a region where the image processing unit 14 performs normal image processing (step S112). For example, in the situation illustrated in FIG. 13, the region setting unit 325 sets a region of the subject E11 contained in each of the left-eye image $W_{L2}$ and the right-eye image $W_{R2}$ as a region where the image processing unit 14 performs the special effect processing and sets a region other than the region of the subject E11 as a region where the image processing unit 14 performs normal image processing.

Then, the control unit 32 judges whether the face detection unit 322 has detected any face of a person in the region to which the region setting unit 325 has set the special effect processing (step S113). If the face detection unit 322 has detected the face of a person in the region to which the region setting unit 325 has set the special effect processing (step S113: Yes), the imaging apparatus 1 proceeds to step S114.

Subsequently, the image processing unit 14 performs the special effect processing set to the imaging apparatus 1, for example, "Fantastic focus" (see FIG. 5) on the region to which the special effect processing is set by the region setting unit 325 (step S114) and performs normal image processing on the region to which the normal image processing is set (step S115). Accordingly, shot images have a background exploiting qualities and properties of the lens unit 3 and a main subject is visually enhanced from the background.

Then, the control unit 32 judges whether the storage mode set to the imaging apparatus 1 is the 3D image storage mode (step S116). If the storage mode set to the imaging apparatus 1 is the 3D image storage mode (step S116: Yes), the control unit 32 generates a 3D image file from left-eye image $W_{L2}$ data and right-eye image $W_{R2}$ data on which special effect processing and/or image processing has been performed by the image processing unit 14 (step S117). The format of a 3D image file is the MPO (Multi Picture Object) method or 3D-AVI method.

Subsequently, the control unit 32 causes the external memory 28 to store the generated image file data (step S118) and judges whether the imaging apparatus 1 is turned off by the power switch 211 being operated (step S119). If the imaging apparatus 1 is not turned off (step S119: No), the imaging apparatus 1 returns to step S101. On the other hand, if the imaging apparatus 1 is turned off (step S119: Yes), the imaging apparatus 1 ends the present processing.

A case when, in step S116, the storage mode set to the imaging apparatus 1 is not the 3D image storage mode (step S116: No) will be described. In this case, the control unit 32 generates an image file from right-eye image $W_{R2}$ data on which special effect processing and/or image processing has been performed by the image processing unit 14 (step S120) and the imaging apparatus 1 proceeds to step S118. The format of this image file is the JPEG method or AVI method. Incidentally, the control unit 32 may generate an image file from the left-eye image $W_{L2}$ on which special effect processing and/or image processing has been performed by the image processing unit 14.

A case when the face detection unit 322 has not detected any face of a person in the region to which the region setting unit 325 has set the special effect processing (step S113: No) will be described. In this case, the image processing unit 14 performs special effect processing that is different from the special effect processing set to the imaging apparatus 1, for example, "Pop art" (see FIG. 5) on the region to which the special effect processing is set by the region setting unit 325 (step S121) and the imaging apparatus 1 proceeds to step S115.

A case when, in step S111, a region where the position difference of a subject exceeds the threshold is not present in the left-eye image $W_{L2}$ and the right-eye image $W_{R2}$ (step S111: No) will be described. In this case, the region setting unit 325 sets normal image processing by the image processing unit 14 to the entire region of the left-eye image $W_{L2}$ and the right-eye image $W_{R2}$ (step S122).

Subsequently, the image processing unit 14 performs the normal image processing on the entire region of the left-eye image $W_{L2}$ and the right-eye image $W_{R2}$ (step S123) and the imaging apparatus 1 proceeds to step S116.

A case when, in step S101, the imaging apparatus 1 is not set to the shooting mode (step S101: No) will be described. In this case, the imaging apparatus 1 performs playback display processing to cause the display unit 25 to display a 2D image corresponding to 2D image data or a 3D image corresponding to 3D image data stored in the external memory 28 (step S124) and the imaging apparatus 1 proceeds to step S119.

According to the first embodiment of the present invention described above, the position difference calculation unit 323 compares positions of a subject contained in a pair of images to calculate a position difference of the subject in the pair of images and the region setting unit 325 sets a region where the image processing unit 14 performs special effect processing on the pair of images based on the position difference of the subject in the pair of images calculated by the position difference calculation unit 323. As a result, properties of a main subject can be reflected.

Further, according to the first embodiment of the present invention, a subject and the background are automatically isolated to perform special effect processing and normal image processing, respectively. Therefore, there is no need for the user to isolate a subject and the background while viewing an image displayed in a display monitor using special software for image processing on a personal computer to perform different image processing on the subject and the background and then to synthesize the subject and the background on which image processing has been performed.

Also, in the first embodiment of the present invention, the threshold setting unit 324 sets the threshold that isolates a subject region and a background region in accordance with the maximum value of a position difference of a subject contained in each of a left-eye image and a right-eye image calculated by the position difference calculation unit 323, but the threshold may be multiplied by a variable, for example, ½.

Also, in the first embodiment of the present invention, while the threshold setting unit 324 sets the threshold that isolates a subject region and a background region in accordance with the maximum value of a position difference of a subject contained in each of a left-eye image and a right-eye image calculated by the position difference calculation unit 323, for example, the threshold may be set in accordance with a difference of the number of pixels of the subject contained in each of the left-eye image and the right-eye image. Further, the threshold set in accordance with the difference of the number of pixels of the subject may be multiplied by a variable.

Also, in the first embodiment of the present invention, the image processing unit 14 performs normal image processing on a background region, but special effect processing that is different from the special effect processing performed on a subject region may be performed.

Also, in the first embodiment of the present invention, the image processing unit 14 performs special effect processing on a subject region, but, for example, normal image processing may be performed on the subject region. In this case, the image processing unit 14 performs special effect processing that enhances the subject region against the background region, i.e., special effect processing combining monochrome image processing and saturation/hue conversion processing.

First Modification of the First Embodiment

Figure 14:
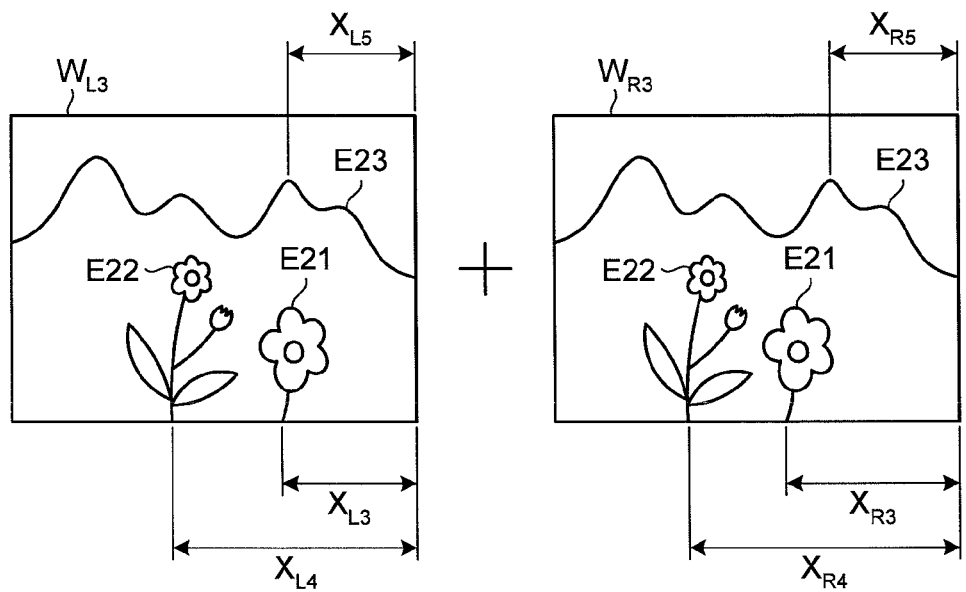
FIG. 14 is a diagram illustrating an overview of processing performed by the position difference calculation unit of an imaging apparatus according to a first modification of the first embodiment of the present invention.

In the embodiment described above, the main subject is a person, but the embodiment can also be applied to a plant or an animal. FIG. 14 is a diagram illustrating an overview of processing performed by the position difference calculation unit 323 of the imaging apparatus 1 according to the first modification of the first embodiment of the present invention.

In the situation illustrated in FIG. 14, the position difference calculation unit 323 compares positions of a subject E21 contained in a left-eye image $W_{L3}$ and a right-eye image $W_{R3}$ to calculate a position difference of the subject E21 in the left-eye image $W_{L3}$ and the right-eye image $W_{R3}$. For example, if the distance from the right edge of the left-eye image $W_{L3}$ to the center position of the subject E21 contained in the left-eye image $W_{L3}$ is $X_{L3}$, the distance from the right edge of the right-eye image $W_{R3}$ to the center position of the subject E21 contained in the right-eye image $W_{R3}$ is $X_{R3}$, and the position difference of the subject E21 contained in each of the left-eye image $W_{L3}$ and the right-eye image $W_{R3}$ is $\Delta X_3$, $\Delta X_3$ is given by $\Delta X_3 = X_{R3} - X_{L3}$.

Next, the position difference calculation unit 323 compares positions of a subject E22 contained in each of the left-eye image $W_{L3}$ and the right-eye image $W_{R3}$ to calculate a position difference of the subject E22 contained in each of the left-eye image $W_{L3}$ and the right-eye image $W_{R3}$. If the distance from the right edge of the left-eye image $W_{L3}$ to the center position of the subject E22 contained in the left-eye image $W_{L3}$ is $X_{L4}$, the distance from the right edge of the right-eye image $W_{R3}$ to the center position of the subject E22 contained in the right-eye image $W_{R3}$ is $X_{R4}$, and the position difference of the subject E22 contained in each of the left-eye image $W_{L3}$ and the right-eye image $W_{R3}$ is $\Delta X_4$, $\Delta X_4$ is given by $\Delta X_4 = X_{R4} - X_{L4}$.

Lastly, the position difference calculation unit 323 compares positions of a subject E23 contained in each of the left-eye image $W_{L3}$ and the right-eye image $W_{R3}$ to calculate a position difference of the subject E23 contained in each of the left-eye image $W_{L3}$ and the right-eye image $W_{R3}$. If the distance from the right edge of the left-eye image $W_{L3}$ to the center position of the subject E23 contained in the left-eye image $W_{L3}$ is $X_{L5}$, the distance from the right edge of the right-eye image $W_{R3}$ to the center position of the subject E23 contained in the right-eye image $W_{R3}$ is $X_{R5}$, and the position difference of the subject E23 contained in each of the left-eye image $W_{L3}$ and the right-eye image $W_{R3}$ is $\Delta X_5$, $\Delta X_5$ is given by $\Delta X_5 = X_{R5} - X_{L5}$.

Thus, the position difference calculation unit 323 compares positions of a subject contained in each of the left-eye image $W_{L3}$ and the right-eye image $W_{R3}$ to correlatingly calculate a position difference of the subject contained in the left-eye image $W_{L3}$ and the right-eye image $W_{R3}$.

Subsequently, the threshold setting unit 324 sets a threshold C that isolates a main subject region and a background subject region based on a position difference calculated by the position difference calculation unit 323. For example, in the situation illustrated in FIG. 14, if the subject distance from the imaging apparatus 1 to a subject is less than 0.6 m (macro shooting), the threshold setting unit 324 sets a region where the position difference of the subject is more than ½₀ as a subject region. Thus, the threshold setting unit 324 sets a value smaller than the position difference $\Delta X_4$ as the threshold.

Then, because the position differences of the subjects E21, E22 calculated by the position difference calculation unit 323 are larger than the threshold C ($\Delta X_3 > \Delta X_4 > C$), the region setting unit 325 sets special effect processing by the image processing unit 14 to each subject region of the subjects E21, E22 contained in the left-eye image $W_{L3}$ and the right-eye image $W_{R3}$. In contrast, because the position difference of the subject E23 calculated by the position difference calculation unit 323 is smaller than the threshold C ($C > \Delta X_5$), the region setting unit 325 sets normal image processing by the image processing unit 14 to the background region of the subject E23 contained in the left-eye image $W_{L3}$ and the right-eye image $W_{R3}$.

Subsequently, if the subject E21 or E22 is not judged by the face detection unit 322 to be a person, the image processing unit 14 performs special effect processing, for example, "Pop art" (see FIG. 5) on the subject region of each of the subjects E21, E22 and performs normal image processing on the region other than the subjects E21, E22.

According to the first modification of the first embodiment of the present invention described above, the first embodiment can be modified to be applicable to a plant or an animal. Further, the region setting unit 325 can set a region of special effect processing by the image processing unit 14 even if a plurality of subjects are contained in each of a left-eye image and a right-eye image.

In the first modification of the first embodiment of the present invention described above, the image processing unit 14 performs the same special effect processing on the subject region of each of the subjects E21, E22, but different special effect processing may be performed on the subject region of each of the subjects E21, E22.

Second Modification of the First Embodiment

Figure 15:
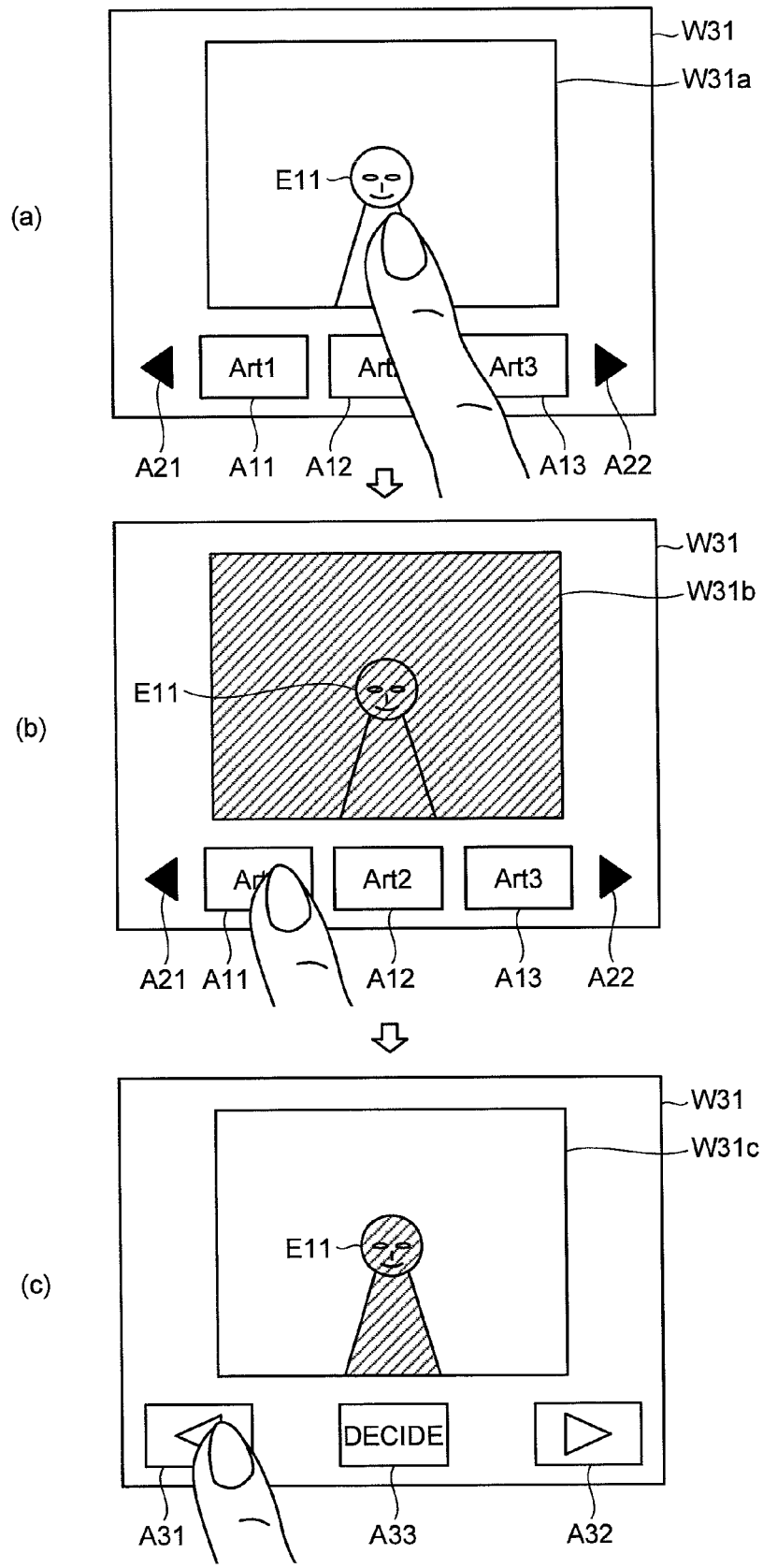
FIG. 15 is a diagram illustrating a change method of changing a threshold set by a threshold setting unit in accordance with an operation signal input from a touch panel by a threshold change unit of an imaging apparatus according to a second modification of the first embodiment of the present invention.

In the first embodiment of the present invention described above, the threshold setting unit 324 sets the threshold that isolates a subject region and a background region contained in each of a left-eye image and a right-eye image in accordance with the maximum value of a position difference of a subject calculated by the position difference calculation unit 323, but the threshold can be changed in accordance with an operation signal input from the touch panel 26. FIG. 15 is a diagram illustrating a change method of changing the threshold set by the threshold setting unit 324 in accordance with an operation signal input from the touch panel 26 by the threshold change unit 326 of the imaging apparatus 1 according to the second modification of the first embodiment of the present invention.

As illustrated in FIG. 15, the user first touches a 2D image W31a displayed on a display screen W31 of the display unit 25 in a region where a desired subject is displayed. In this case, the position difference calculation unit 323 calculates a position difference of the subject E11 touched by the user in accordance with an operation signal input from the touch panel 26 (FIG. 15(a)). At this point, the threshold setting unit 324 sets the threshold in accordance with the maximum value of the position difference calculated by the position difference calculation unit 323.

Subsequently, the user touches one of the special effect icons A11 to A13 concerning special effect processing displayed by the display unit 25. In the situation illustrated in FIG. 15, if the user touches the special effect icon A11, the image processing unit 14 references the special effect processing information table T1 stored in the special effect processing information storage unit 272 to perform the special effect processing in accordance with an operation signal input from the touch panel 26, for example, "Fantastic focus" on a whole 2D image W31b (FIG. 15(b)).

Then, the user touches the switching icon A21 or the switching icon A22 that instructs the change of the threshold. In this case, the threshold change unit 326 changes the threshold set by the threshold setting unit 324 in accordance with an operation signal input from the touch panel 26. Accompanying the change, the region setting unit 325 sets special effect processing to a region where the position difference exceeds the threshold and also sets normal image processing to a region where the position difference is equal to or less than the threshold. Then, the image processing unit 14 performs the special effect processing and the normal image processing on the regions to which the region setting unit 325 sets the special effect processing and the normal image processing, respectively (FIG. 15(c)).

According to the second modification of the first embodiment of the present invention described above, the threshold that isolates a subject region and a background region can manually be changed. As a result, the region of special effect processing by the image processing unit 14 can be checked by an intuitive operation while viewing a live view image displayed by the display unit 25.

While the threshold change unit 326 changes the threshold in accordance with an operation signal input from the touch panel 26 in the second modification of the first embodiment of the present invention described above, the threshold may be changed in accordance with an operation signal, for example, input from the operation input unit 21.

Third Modification of the First Embodiment

In the first embodiment of the present invention described above, the combination of image processing in each piece of special effect processing performed by the image processing unit 14 is the same, but a parameter θ of image processing combined with each piece of special effect processing can be changed in accordance with the position difference of a subject or the subject.

FIG. 16 is a diagram illustrating an example of the special effect processing information table stored in the special effect processing information storage unit 272 according to a third modification of the first embodiment of the present invention.

As illustrated in FIG. 16, a special effect processing information table T2 has content of special effect processing that can be performed on each of left-eye image data and right-eye image data by the special effect processing unit 141 and image processing of each piece of the special effect processing described therein. Further, the strength of image processing in each piece of special effect processing is described. If, for example, the subject is "Person" and "Fantastic focus" of special effect processing "Art1" is selected, "Tone curve processing", "Blurring processing", and "Synthesis processing" are described as processing content of the image processing. Further, "(Weak)" is described for "Tone curve processing" and "(Strong)" is described for "Blurring processing".

Thus, if the position difference of a subject is large, for example, 1/100 is exceeded, the image processing unit 14 can perform optimal special effect processing on the region of the subject contained in each of left-eye image data and right-eye image data in accordance with the position difference of the subject by changing the level of strength of combined image processing for each piece of the special effect processing. Further, the image processing unit 14 can perform optimal special effect processing in accordance with each subject.

Fourth Modification of the First Embodiment

In the first embodiment of the present invention described above, a pair of pieces of image data is generated by using the 3D shooting-capable lens unit 3, but, for example, only one optical system may be configured to generate a pair of pieces of image data by continuously capturing images in this configuration. More specifically, as illustrated in FIG. 17, a pair of pieces of image data having a parallax with respect to a subject may be generated by capturing a subject E100 continuously while an imaging apparatus 200 being moved (arrow C) from left to right by the user.

Second Embodiment

Next, the second embodiment of the present invention will be described. An imaging apparatus according to the second embodiment is different from an imaging apparatus according to the first embodiment in the configuration of only a control unit and nonvolatile memory. Thus, only the nonvolatile memory and the control unit of an imaging apparatus according to the second embodiment will be described below. The same reference numerals are attached to the same structural elements below for the description.

Figure 18:
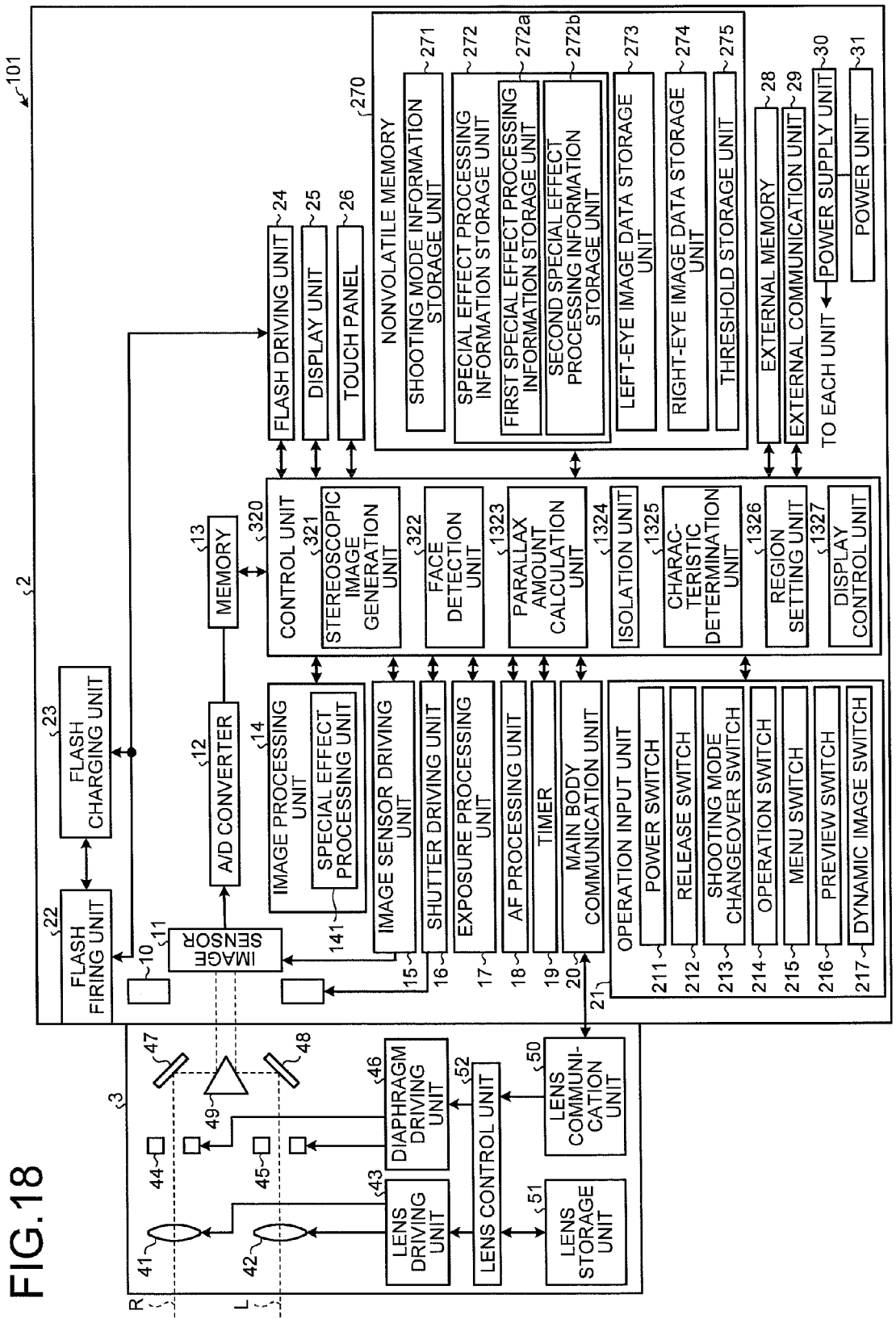
FIG. 18 is a block diagram illustrating the configuration of an imaging apparatus according to a second embodiment of the present invention.

FIG. 18 is a block diagram illustrating the configuration of an imaging apparatus according to the second embodiment of the present invention. An imaging apparatus 101 is a digital single-lens reflex camera and includes the main body unit 2 and the lens unit 3 attachable to and removable from the main body unit 2.

Nonvolatile memory 270 is configured by using flash memory. The nonvolatile memory 270 stores various programs to cause the imaging apparatus 101 to operate, imaging programs according to the second embodiment, and various kinds of data and parameters used during execution of programs. The nonvolatile memory 270 includes a shooting mode information storage unit 271 that stores information about various shooting modes executed by the imaging apparatus 101, a special effect processing information storage unit 272 that stores information about special effect processing performed by the image processing unit 14, a left-eye image data storage unit 273 that stores left-eye image data used when the display unit 25 is caused to display 3D images, a right-eye image data storage unit 274 that stores right-eye image data used when the display unit 25 is caused to display 3D images, and a threshold storage unit 275 that stores a threshold to isolate a short-range region (subject region) and a background region from the region of each of a captured left-eye image and right-eye image.

The special effect processing information storage unit 272 includes a first special effect processing information storage unit 272a and a second special effect processing information storage unit 272b. The first special effect processing information storage unit 272a stores first special effect processing information that provides the degree of recommendation in accordance with characteristics determined by a characteristic determination unit 1325 and the combination of special effect processing that can be performed on each of a left-eye image and a right-eye image by the image processing unit 14. The second special effect processing information storage unit 272b stores second special effect processing information that provides the degree of recommendation of special effect processing that can be performed on each of a left-eye image and a right-eye image by the image processing unit 14.

A control unit 320 is configured by using a CPU or the like. The control unit 320 controls the operation of the imaging apparatus 101 in a unified manner by reading and executing programs from the nonvolatile memory 270 in accordance with an operation signal or instruction signal from the operation input unit 21 and transferring instructions or data corresponding to each unit constituting the imaging apparatus 101. The control unit 320 includes a stereoscopic image generation unit 321, a face detection unit 322, a parallax amount calculation unit 1323, an isolation unit 1324, the characteristic determination unit 1325, a region setting unit 1326, and a display control unit 1327.

The parallax amount calculation unit 1323 calculates a parallax amount of a pair of images by superimposing a similar region contained in each of the pair of images. More specifically, the parallax amount calculation unit 1323 calculates a parallax amount of a left-eye image and a right-eye image by superimposing a similar region, for example, a background region contained in each of the left-eye image and the right-eye image.

The isolation unit 1324 isolates a short-range region and a background region from the region of each of a pair of images in accordance with a parallax amount calculated by the parallax amount calculation unit 1323. More specifically, the isolation unit 1324 isolates a region in each of a left-eye image and a right-eye image where the parallax amount is equal to or more than the threshold stored in the threshold storage unit 275 as a short-range region and a region where the parallax amount is less than the threshold as a background region.

The characteristic determination unit 1325 determines characteristics of a face detected by the face detection unit 322 by using known technology. More specifically, the characteristic determination unit 1325 determines whether characteristics of a face detected by the face detection unit 322 belong to a man, woman, baby (child), or animal. When a baby is determined according to a determination method, positions of feature points of the face detected by the face detection unit 322, for example, eyes, the nose, and lips are extracted and the extracted feature points are compared with standard sample data of the face of a baby. Further, when an animal is determined, the characteristic determination unit 1325 determines whether a face detected by the face detection unit 322 is an animal by extracting feature data of the face detected by the face detection unit 322 by using a plurality of pieces of sample data of the face of an animal such as a dog and cat and judging whether the feature data are equal to or more than set thresholds.

If the face detected by the face detection unit 322 is in a short-range region, the region setting unit 1326 sets the background region as a region where the image processing unit 14 performs special effect processing. If the characteristic determination unit 1325 determines characteristics of the face detected by the face detection unit 322, the region setting unit 1326 references the first special effect processing information stored in the first special effect processing information storage unit 272a to set the special effect processing with the highest degree of recommendation as the processing to be performed by the image processing unit 14. If the face detected by the face detection unit 322 is not in a short-range region or the characteristic determination unit 1325 cannot determine characteristics of the face detected by the face detection unit 322, the region setting unit 1326 references the second special effect processing information stored in the second special effect processing information storage unit 272b to set the special effect processing with the highest degree of recommendation as the processing to be performed by the image processing unit 14. Further, if the face detected by the face detection unit 322 is not in a short-range region or the characteristic determination unit 1325 cannot determine characteristics of the face detected by the face detection unit 322, the region setting unit 1326 sets all regions of a left-eye image and a right-eye image as a region of special effect processing performed by the image processing unit 14.

The display control unit 1327 changes the display mode of the display unit 25. More specifically, the display control unit 1327 exercises control to switch an image displayed in the display unit 25 to a 2D image or 3D image. When the display unit 25 displays a 2D image, if an operation signal is input from the operation input unit 21, the display control unit 1327 causes the display unit 25 to display icons about special effect processing information performed by the special effect processing unit 141.

The situation when the imaging unit 100 generates two pieces of image data having overlapping edge portions in the left and right direction of respective fields of view in the imaging apparatus 101 having the above configuration will be described. As illustrated in FIG. 6, the imaging unit 100 generates left-eye image data and right-eye image data on the image sensor 11 by capturing a subject E1 (distance $d_1$) and a subject E2 (distance $d_2$) having different distances from the first optical system 41 and the second optical system 42 by the first optical system 41 and the second optical system 42 provided side by side with a distance (base length) $D_1$ therebetween.

Subsequently, the stereoscopic image generation unit 321 divides image data generated by the image sensor 11 into left-eye image data and right-eye image data. Then, the stereoscopic image generation unit 321 generates a left-eye image and a right-eye image by cutting out the divided left-eye image data and right-eye image data in a predetermined length-to-width ratio.

As illustrated in FIG. 7, the stereoscopic image generation unit 321 generates a left-eye image $W_{L1}$ and a right-eye image $W_{R1}$ in which positions of the subjects E1, E2 are shifted laterally due to a parallax between the first optical system 41 and the second optical system 42.

Subsequently, the display control unit 1327 causes the display unit 25 to superimpose and display the subject E2 of the left-eye image $W_{L1}$ and the subject E2 of the right-eye image $W_{R1}$ (see FIG. 8). Accordingly, a stereoscopic 3D image in which the subject E1 protrudes from the display panel 252 by $\Delta Z_1$ in accordance with a shift amount $\Delta X_1$ caused by the parallax of the subject E1 can virtually be recognized (see FIG. 9).

Then, the parallax amount calculation unit 1323 calculates a parallax amount by superimposing the subject E2 of the left-eye image $W_{L1}$ and the subject E2 of the right-eye image $W_{R1}$. For example, in the situation illustrated in FIG. 7, if the width of the left-eye image $W_{L1}$ or the right-eye image $W_{R1}$ is $X_0$ the parallax amount calculation unit 1323 calculates a parallax amount in accordance with the ratio of the width $X_0$.

Subsequently, the isolation unit 1324 judges whether to isolate a short-range region and a background region from the region of each of the left-eye image $W_{L1}$ and the right-eye image $W_{R1}$ in accordance with a parallax amount calculated by the parallax amount calculation unit 1323. More specifically, in the situation illustrated in FIG. 8, the isolation unit 1324 isolates a region where the parallax amount is shifted by $\frac{1}{100}$ (1%) or more with respect to the width $X_0$ as a short-range region. In the situation illustrated in FIG. 6, for example, if the width $X_0$ of a captured image is 35 mm, a distance $d_1$ from the first optical system 41 and the second optical system 42 to the subject E1 is 1000 mm, a distance F from the first optical system 41 and the second optical system 42 to the image sensor 11 is 35 mm, a distance $D_1$ from the center of the first optical system 41 to the center of the second optical system 42 is 10 mm, and the parallax amount with respect to the background (infinite) is $\Delta X$, $\Delta X$ is calculated as $\Delta X = (F \times D_1)/d_1 = (35 \times 10)/1000 = 0.35$. Because the parallax amount $\Delta X$ is $\frac{1}{100}$ (=0.35/35) of the width $X_0$ under this situation, the isolation unit 1324 can isolate a short-range region and a background region from each of the left-eye image $W_{L1}$ and the right-eye image $W_{R1}$. More specifically, the isolation unit 1324 isolates a region where the parallax amount calculated by the parallax amount calculation unit 1323 is equal to or more than the threshold stored in the threshold storage unit 275 as a short-range region from each of the left-eye image $W_{L1}$ and the right-eye image $W_{R1}$.

Thus, the parallax amount calculation unit 1323 calculates a parallax amount by superimposing the subject E2 of the left-eye image $W_{L1}$ and the subject E2 of the right-eye image $W_{R1}$. Then, the isolation unit 1324 isolates a short-range region and a background region from the region of each of the left-eye image $W_{L1}$ and the right-eye image $W_{R1}$ in accordance with the parallax amount calculated by the parallax amount calculation unit 1323.

Next, processing content of special effect processing performed by the image processing unit 14 in special effect shooting mode will be described with reference to FIGS. 19 and 20. FIG. 19 is a diagram illustrating an example of the first special effect processing information table stored in the first special effect processing information storage unit 272*a*. FIG. 20 is a diagram illustrating an example of the second special effect processing information table stored in the second special effect processing information storage unit 272*b*.

As illustrated in FIG. 19, a first special effect processing information table T11 has special effect processing that can be performed by the image processing unit 14 on each of a left-eye image and a right-eye image in special effect shooting mode and content of image processing of each piece of the special effect processing described therein. Further, the first special effect processing information table T11 has the degree of recommendation in accordance with the combination of characteristics of a face determined by the characteristic determination unit 1325 and special effect processing that can be performed by the image processing unit 14 on each of a left-eye image and a right-eye image described therein. If, for example, the characteristic determination unit 1325 determines a face in "Fantastic focus" of the special effect processing "Art1" in the set special effect shooting mode as "Man", "Tone curve processing (weak)", "Blurring processing (strong)", and "Synthesis processing" are described as processing content and "4" is described as the degree of recommendation. The synthesis processing is image processing that generates image data by synthesizing image data obtained after tone curve processing being performed by the image processing unit 14 and image data obtained after blurring processing being performed by the image processing unit 14. If the characteristic determination unit 1325 determines a face in "Fantastic focus" of the special effect processing "Art1" in the set special effect shooting mode as "Woman", "Tone curve processing (strong)", "Blurring processing (weak)", and "Synthesis processing" are described as processing content and "1" is described as the degree of recommendation.

Further, if the characteristic determination unit 1325 determines a face in "Ink wash painting" of the special effect processing "Art7" in the set special effect shooting mode as "Man", "Color judgment blocking processing", "Binarization processing", and "Edge processing (weak)" are described as processing content and "7" is described as the degree of recommendation. The color judgment blocking processing is image processing that converts similar colors in an image to the same color and also blocks pixels in the same size.

Thus, the first special effect processing information table T11 has the degree of recommendation of each piece of special effect processing performed by the image processing unit 14 and also a parameter of image processing described in each piece of special effect processing changed in accordance with characteristics of a face determined by the characteristic determination unit 1325 described therein. If the subject is, for example, a baby or a pet, the background of shot images tends to be the ground and moreover, a baby or a pet is taken more lovely when appearing plump. Thus, when the subject is a baby or a pet, the boundary between the subject and the background is enhanced by setting the highest degree of recommendation for the special effect processing (Fantastic focus) that blurs the background. Accordingly, the subject can be made to stand out from the background in an atmosphere becoming for an image of the subject. Though only three types of characteristics of the subject are described in the first special effect processing information table T11, for example, each piece of special effect processing and the degree of recommendation may be described for each age or each type of pet. Further, each piece of special effect processing and the degree of recommendation may be described in accordance with the number of subjects or movement thereof.

Next, the second special effect processing information table stored in the second special effect processing information storage unit 272b will be described. As illustrated in FIG. 20, a second special effect processing information table T12 has special effect processing that can be performed by the image processing unit 14 on each of a left-eye image and a right-eye image in special effect shooting mode and content of image processing of each piece of the special effect processing described therein. When, for example, "Fantastic focus" of the special effect processing "Art1" in the set special effect shooting mode is selected, "Tone curve processing (weak)", "Blurring processing (strong)", and "Synthesis processing" are described as processing content and "1" is described as the degree of recommendation.

Further, when "Diorama" of the special effect processing "Art9" in the set special effect shooting mode is selected, "Hue/saturation processing", "Contrast processing", "Three-time blurring processing" and "Three-time synthesis processing" are described as processing content and "9" is described as the degree of recommendation. The three-time blurring processing is processing in which after the hue/saturation processing, the image processing unit 14 performs the blurring processing three times on image data on which the contrast processing has been performed. The three-time synthesis processing is processing in which image data is generated by synthesizing image data before the blurring processing and image data after the blurring processing each time the image processing unit 14 performs the blurring processing.

Thus, the user is caused to actively select special effect processing with a high degree of recommendation by the degree of recommendation of special effect processing when the user manually sets special effect processing to the imaging apparatus 101, while setting the degree of recommendation of special effect processing assumed for 2D images low. Accordingly, the possibility of selecting special effect processing, in which two-dimensional positions and three-dimensional positions are incompatible when 3D images are shot, can be reduced.

Figure 21:
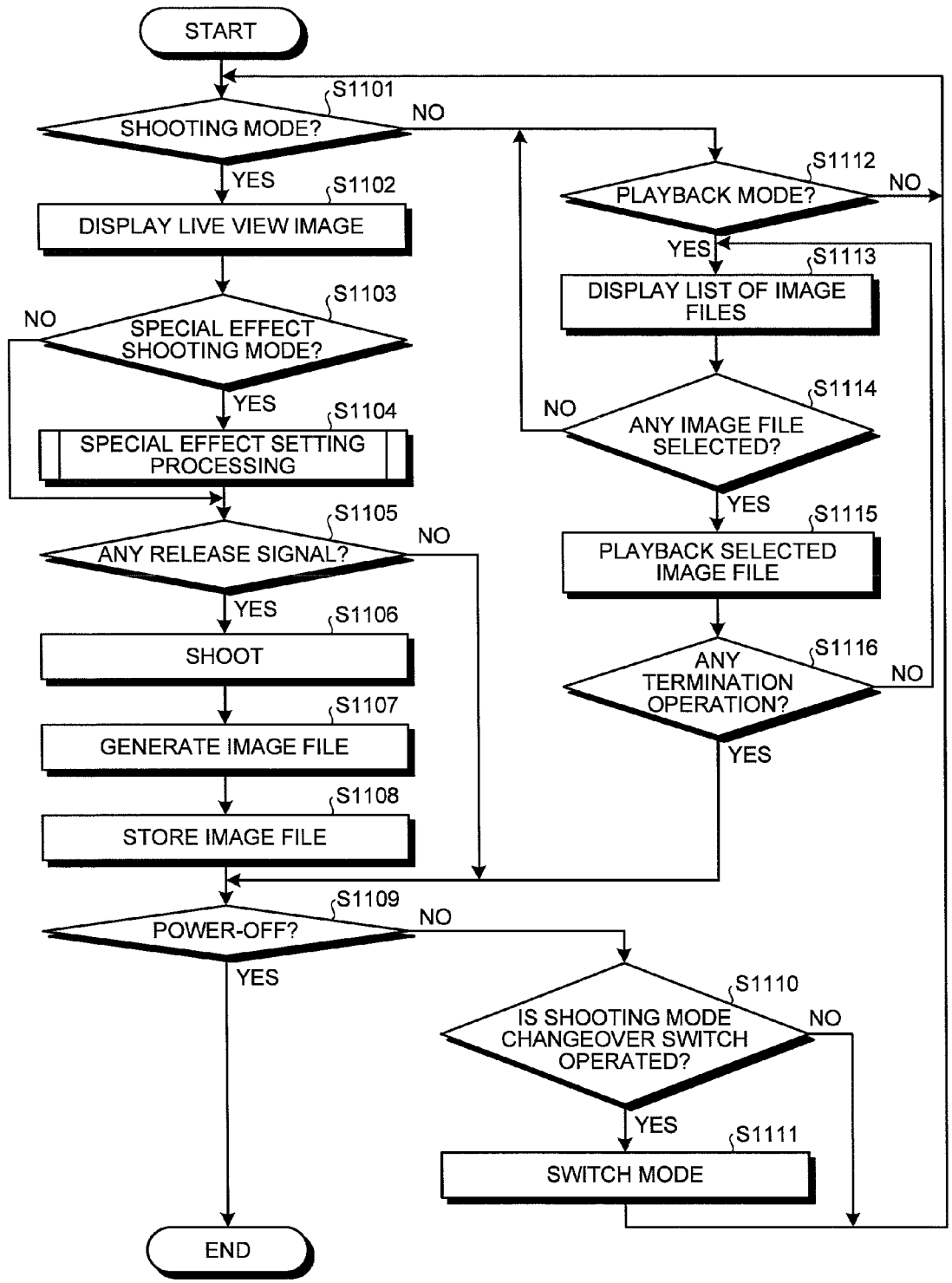
FIG. 21 is a flow chart illustrating an overview of processing performed by the imaging apparatus according to the second embodiment of the present invention.

Next, the processing performed by the imaging apparatus 101 according to the second embodiment will be described. FIG. 21 is a flow chart illustrating an overview of processing performed by the imaging apparatus 101.

As illustrated in FIG. 21, the control unit 320 first judges whether the imaging apparatus 101 is in shooting mode (step S1101). If the imaging apparatus 101 is in shooting mode (step S1101: Yes), the imaging apparatus 101 proceeds to step S1102 described later. On the other hand, if the imaging apparatus 101 is not set to the shooting mode (step S1101: No), the imaging apparatus 101 proceeds to step S1112.

A case when, in step S1101, the imaging apparatus 101 is set to the shooting mode (step S1101: Yes) will be described. In this case, the display control unit 1327 causes the display unit 25 to display a live view image of a 3D image corresponding to a pair of pieces of image data generated successively at fixed minute intervals by the imaging unit 100 (step S1102). More specifically, the display control unit 1327 causes the display unit 25 to display a live view image of a 3D image generated by left-eye image data and right-eye image data being isolated by the stereoscopic image generation unit 321 from a pair of pieces of image data generated by the imaging unit 100.

Subsequently, the control unit 320 judges whether the shooting mode is the special effect shooting mode (step S1103). If the shooting mode is the special effect shooting mode (step S1103: Yes), the imaging apparatus 101 performs special effect setting processing that causes a visual effect on an image to be captured (step S1104) before proceeding to step S1105.

In contrast, if the shooting mode is not the special effect shooting mode (step S1103: No), the imaging apparatus 101 proceeds to step S1105 described later.

If a release signal instructing shooting is input after the release switch 212 being operated (step S1105: Yes), the imaging apparatus 101 shoots (step S1106).

Subsequently, the control unit 320 creates an image file from captured image data (step S1107). The image file is generated from, for example, image data obtained after special effect processing being performed by the image processing unit 14 on each of a left-eye image and a right-eye image generated by the imaging unit 100.

Then, the control unit 320 causes the external memory 28 to store the generated image file (step S1108).

Subsequently, the control unit 320 judges whether the imaging apparatus 101 is turned off after the power switch 211 being operated (step S1109). If the imaging apparatus 101 is turned off (step S1109: Yes), the imaging apparatus 101 ends the present processing.

In contrast, if the imaging apparatus 101 is not turned off (step S1109: No), the control unit 320 switches the mode of the imaging apparatus 101 (step S1111) in accordance with an operation signal input from the shooting mode changeover switch 213 when the shooting mode changeover switch 213 is operated (step S1110: Yes) and the imaging apparatus 101 returns to step S1101.

A case when, in step S1101, the imaging apparatus 101 is not in shooting mode (step S1101: No) will be described. In this case, the control unit 320 judges whether the imaging apparatus 101 is in playback mode (step S1112). If the imaging apparatus 101 is not in playback mode (step S1112: No), the imaging apparatus 101 returns to step S1101.

In contrast, if the imaging apparatus 101 is in playback mode (step S1112: Yes), the display control unit 1327 causes the display unit 25 to display a list of image files stored in the external memory 28 (step S1113).

Subsequently, when an image file is selected from the list of image files displayed by the display unit 25 (step S1114: Yes), the display control unit 1327 causes the display unit 25 to display an image corresponding to the image data contained in the selected image file (step S1115).

Then, the control unit 320 judges whether a termination operation of the image playback is performed (step S1116). More specifically, the control unit 320 judges whether the playback mode is switched to the shooting mode by the shooting mode changeover switch 213 being operated. If no termination operation of image playback is performed (step S1116: No), the imaging apparatus 101 returns to step S1113 described above. On the other hand, if a termination operation of image playback is performed (step S1116: Yes), the imaging apparatus 101 proceeds to step S1109.

If, in step S1105, no release signal is input (step S1105: No), the imaging apparatus 101 proceeds to step S1109.

If, in step S1110, the shooting mode changeover switch 213 is not operated (step S1110: No), the imaging apparatus 101 returns to step S1101.

If, in step S1114, no image file is selected from the list of image files displayed by the display unit 25 (step S1114: No), the imaging apparatus 101 returns to step S1112.

Figure 22:
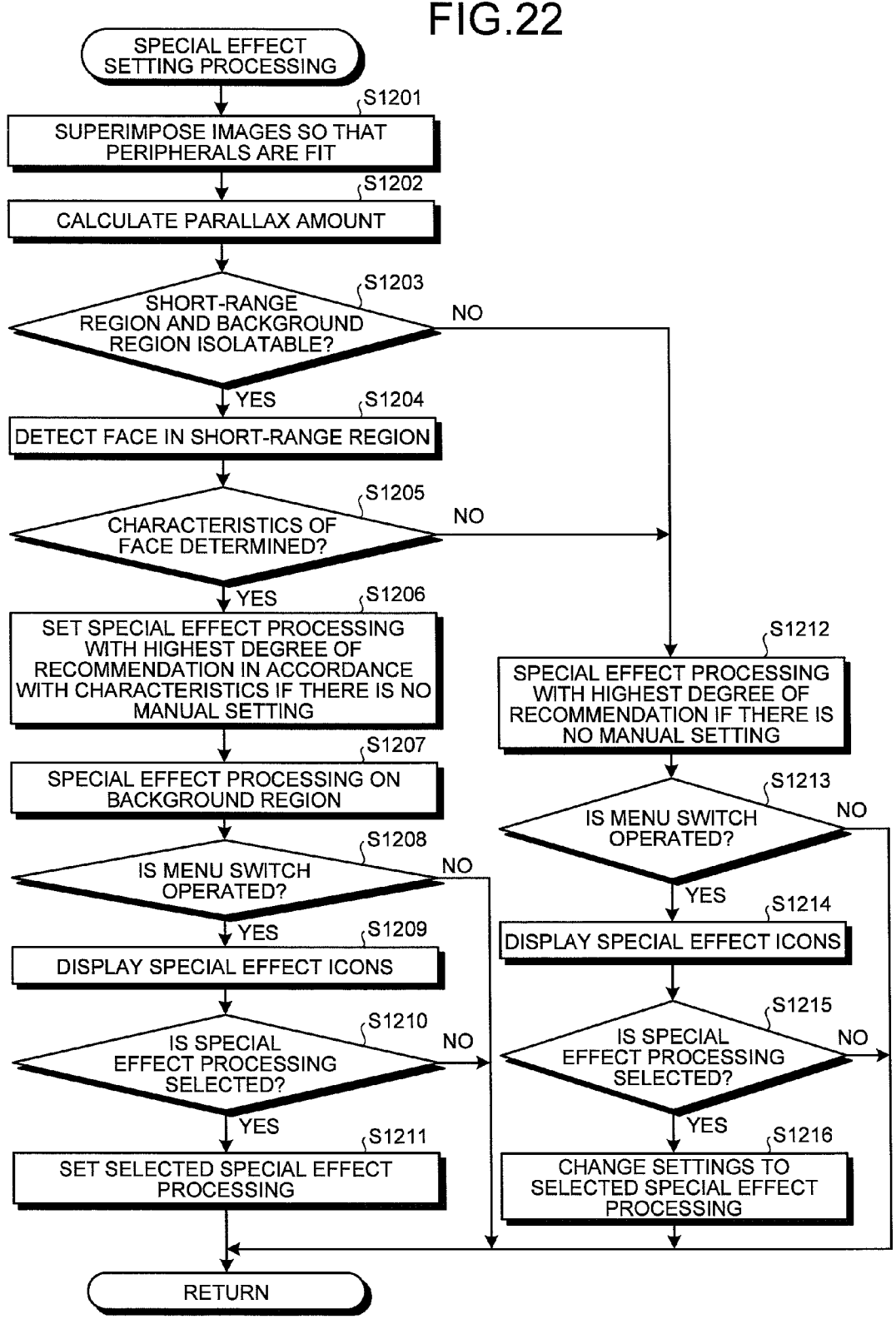
FIG. 22 is a flow chart illustrating an overview of special effect processing settings illustrated in FIG. 21.

Next, special effect setting processing in step S1104 illustrated in FIG. 21 will be described. FIG. 22 is a flow chart illustrating an overview of special effect setting processing illustrated in FIG. 21.

As illustrated in FIG. 22, the parallax amount calculation unit 1323 first superimposes a left-eye image and a right-eye image so that a peripheral region contained in each of the left-eye image and the right-eye image is fit to calculate a parallax amount of the left-eye image and the right-eye image (step S1202). For example, the parallax amount calculation unit 1323 calculates a parallax amount of a left-eye image and a right-eye image by superimposing the background contained in each of the left-eye image and the right-eye image.

Subsequently, the isolation unit 1324 performs isolation processing that isolates a short-range region and a background region from the region of each of the left-eye image and the right-eye image in accordance with the parallax amount calculated by the parallax amount calculation unit 1323 (step S1203). More specifically, the isolation unit 1324 judges whether there is any region where the parallax amount calculated by the parallax amount calculation unit 1323 is equal to or more than the threshold stored in the threshold storage unit 275. Then, if there is a region where the parallax amount calculated by the parallax amount calculation unit 323 is equal to or more than the threshold stored in the threshold storage unit 275, the isolation unit 1324 isolates the region where the parallax amount calculated by the parallax amount calculation unit 1323 is equal to or more than the threshold stored in the threshold storage unit 275 as a short-range region. If a short-range region and a background region can be isolated from each of the left-eye image and the right-eye image (step S1203: Yes), the face detection unit 322 detects the face of a person contained in the short-range region of the left-eye image or the right-eye image (step S1204).

Then, the characteristic determination unit 1325 performs characteristic determination processing to determine characteristics of the face detected by the face detection unit 322 (step S1205). If characteristics of the face detected by the face detection unit 322 can be determined (step S1205: Yes), the region setting unit 1326 references the first special effect processing information table T11 stored in the special effect processing information storage unit 272 to set the special effect processing with the highest degree of recommendation in accordance with characteristics determined by the characteristic determination unit 1325 as the processing to be performed by the image processing unit 14 if there is no manual setting of special effect processing by the user (step S1206). If, for example, the characteristic determination unit 1325 determines that the face detected by the face detection unit 322 belongs to a man, the region setting unit 1326 sets the special effect processing with the highest degree of recommendation (see FIG. 19) as the processing to be performed by the image processing unit 14.

Subsequently, the image processing unit 14 performs the special effect processing set by the region setting unit 1326 on the background region (step S1207). Accordingly, a live view image displayed by the display unit 25 is a 3D image in which special effect processing is performed on the background region only so that the short-range region (main subject) is enhanced compared with the background region.

Figure 23:
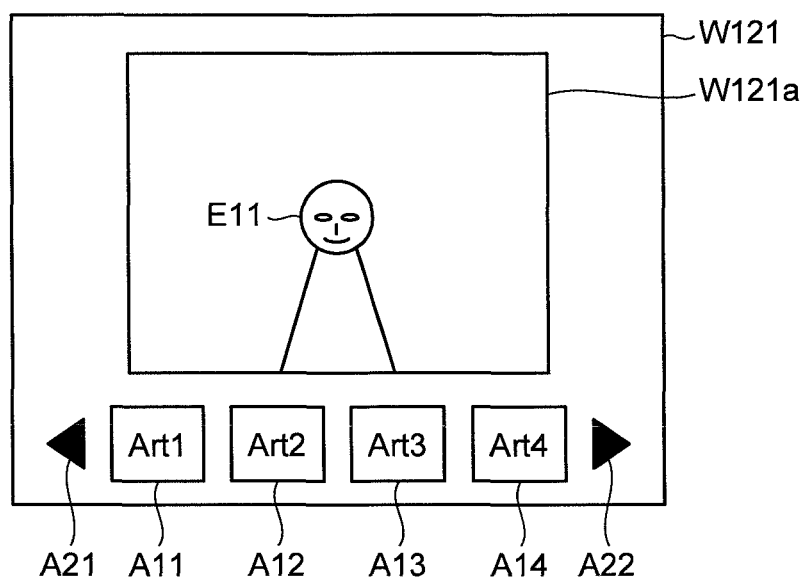
FIG. 23 is a diagram illustrating an example of the image displayed by the display unit of the imaging apparatus according to the second embodiment of the present invention.

Then, if the menu switch 215 is operated (step S1208: Yes), the display control unit 1327 causes the display unit 25 to display special effect icons about special effect processing information (step S1209). More specifically, as illustrated in FIG. 23, the display control unit 1327 causes the display unit 25 to display a live view image W121a, special effect icons A11 to A14 about special effect processing, and switching icons A21, A22 into which a switching instruction of the special effect icons is input on a display screen W121 of the display unit 25. In this case, the display control unit 1327 may cause the display unit 25 to display special effect icons of only special effect processing applicable to 3D images.

Subsequently, if an operation to select a special effect icon displayed by the display unit 25 is performed to select the special effect processing (step S1210: Yes), the region setting unit 1326 changes the setting from the special effect processing set at that time to the selected special effect processing (step S1211). Then, the imaging apparatus 101 returns to the main routine in FIG. 21.

A case when the isolation unit 1324 cannot isolate a short-range region and a background region from each of the left-eye image and the right-eye image (step S1203: No) or the characteristic determination unit 1325 cannot determine characteristics of the face detected by the face detection unit 322 (step S1205: No) will be described. In this case, the image processing unit 14 references the second special effect processing information table T12 stored in the second special effect processing information storage unit 272b to perform the special effect processing with the highest degree of recommendation on the entire region of each of the left-eye image and the right-eye image if there is no manual setting of special effect processing by the user (step S1212).

Subsequently, if the menu switch 215 is operated (step S1213: Yes), the display control unit 1327 causes the display unit 25 to display special effect icons (see FIG. 23) about special effect processing information (step S1214).

Then, if an operation to select a special effect icon displayed by the display unit 25 is performed to select the special effect processing (step S1215: Yes), the region setting unit 1326 sets the selected special effect processing from the special effect processing set at that time (step S1216). Then, the imaging apparatus 101 returns to the main routine in FIG. 21.

If, in step S1208, the menu switch 215 is not operated (step S1208: No), if, in step S1210, no special effect processing is selected (step S1210: No), if, in step S1213, the menu switch 215 is not operated (step S1213: No), or if, in step S1215, no special effect processing is selected (step S1215: No), the imaging apparatus 101 returns to the main routine in FIG. 21.

According to the second embodiment of the present invention described above, the isolation unit 1324 isolates a short-range region and a background region from the region of each of a left-eye image and a right-eye image in accordance with a parallax amount calculated by the parallax amount calculation unit 1323 and, if the face detected by the face detection unit 322 is in the short-range region, the region setting unit 1326 sets the background region as a region where special effect processing is performed by the image processing unit 14. As a result, the subject can be made to stand out by the background while reality of the subject being maintained.

Further, according to the second embodiment of the present invention, if the characteristic determination unit 1325 determines characteristics of the face detected by the face detection unit 322, the first special effect processing information table T11 is referenced to set the special effect processing with the highest degree of recommendation as the processing to be performed by the image processing unit 14. Accordingly, the boundary between the subject and background can be enhanced in accordance with characteristics of the subject and thus, the subject can be made to stand out in an atmosphere more becoming suitable for an image of the subject.

Third Embodiment

Next, the third embodiment of the present invention will be described. The third embodiment of the present invention is different from the second embodiment in special effect setting processing performed by an imaging apparatus. Thus, only special effect setting processing performed by an imaging apparatus according to the third embodiment of the present invention will be described. An imaging apparatus according to the third embodiment of the present invention has the same configuration as the configuration of the imaging apparatus 101 according to the second embodiment described above and thus, a description thereof is omitted.

Figure 24:
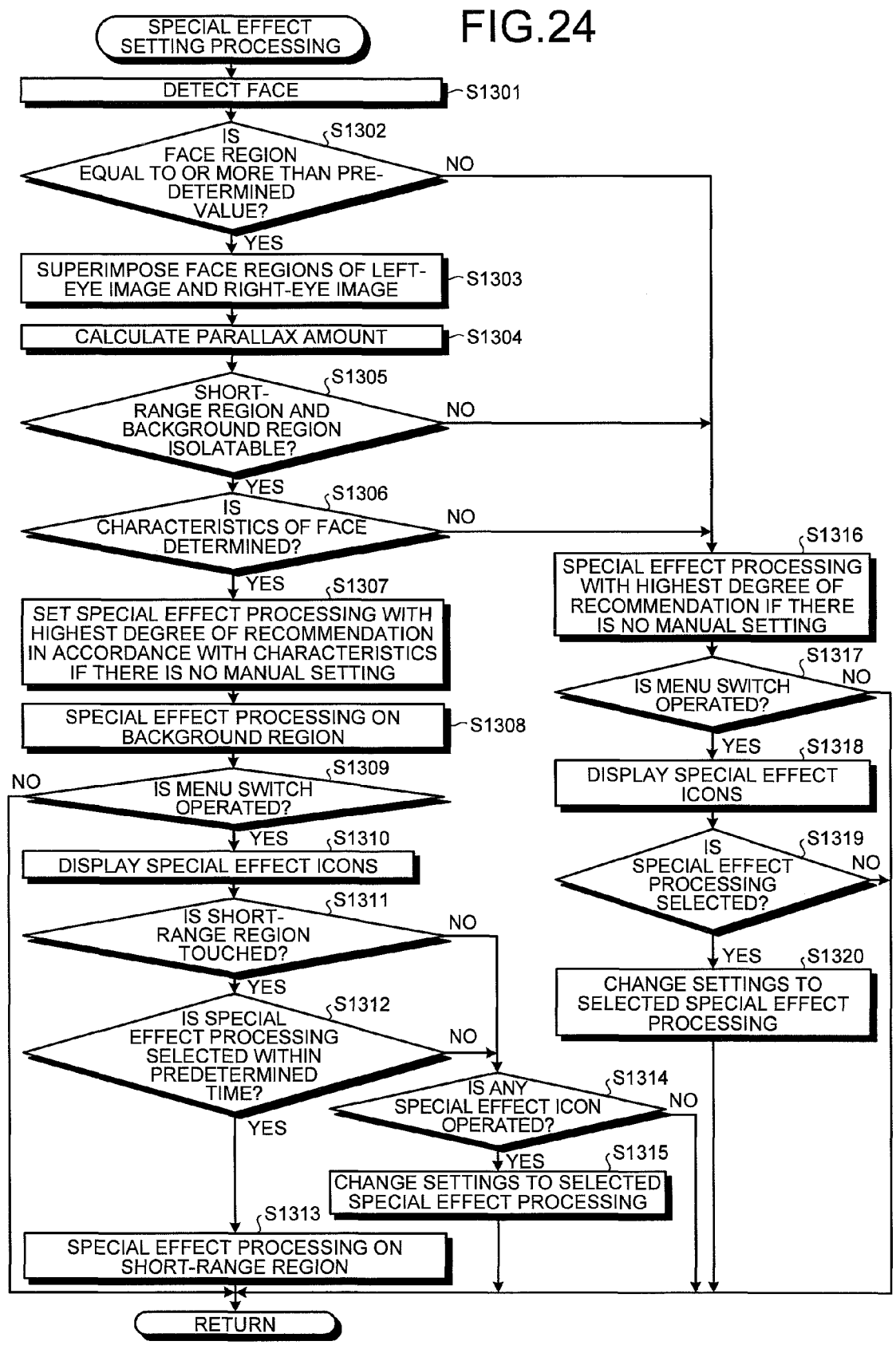
FIG. 24 is a flow chart illustrating an overview of special effect setting processing performed by the imaging apparatus according to the second embodiment of the present invention.

FIG. 24 is a flow chart illustrating an overview of special effect setting processing performed by the imaging apparatus 101 according to the third embodiment.

As illustrated in FIG. 24, the face detection unit 322 first detects any face contained in each of a left-eye image and a right-eye image (step S1301).

Subsequently, the control unit 320 judges whether a face region of the face detected by the face detection unit 322 from each of the left-eye image and the right-eye image is equal to or more than a predetermined value (step S1302). More specifically, the control unit 320 judges whether the face region of the face detected by the face detection unit 322 from each of the left-eye image and the right-eye image occupies, for example, 5% of the entire image or more. If the face region of the face is equal to or more than the predetermined value (step S1302: Yes), the imaging apparatus 101 proceeds to step S1303.

Then, the parallax amount calculation unit 1323 superimposes the face region of the left-eye image and the face region of the right-eye image detected by the face detection unit 322 (step S1303) to calculate a parallax amount of the left-eye image and the right-eye image (step S1304).

Subsequently, the isolation unit 1324 performs isolation processing that isolates a short-range region and a background region from the region of each of the left-eye image and the right-eye image in accordance with the parallax amount calculated by the parallax amount calculation unit 1323 (step S1305). If a short-range region and a background region can be isolated from each of the left-eye image and the right-eye image (step S1305: Yes), the imaging apparatus 101 proceeds to step S1306.

Then, the characteristic determination unit 1325 determines characteristics of the face detected by the face detection unit 322 (step S1306). If characteristics of the face detected by the face detection unit 322 can be determined (step S1306: Yes), the region setting unit 1326 references the first special effect processing information table T11 stored in the first special effect processing information storage unit 272a to set the special effect processing with the highest degree of recommendation in accordance with characteristics determined by the characteristic determination unit 1325 as the processing to be performed by the image processing unit 14 if there is no manual setting of special effect processing by the user (step S1307).

Subsequently, the image processing unit 14 performs the special effect processing set by the region setting unit 1326 on the background region of each of the left-eye image and the right-eye image (step S1308). Accordingly, a live view image displayed by the display unit 25 is a 3D image in which a special effect is applied to the background region only so that the short-range region is enhanced compared with the background region.

Then, if the menu switch 215 is operated (step S1309: Yes), the display control unit 1327 causes the display unit 25 to display special effect icons (step S1310).

Subsequently, if the short-range region of the 3D image displayed by the display unit 25 is touched (step S1311: Yes) and an operation to operate a special effect icon is performed within a predetermined time, for example, 3 sec. to select the special effect processing (step S1312: Yes), the image processing unit 14 performs the selected special effect processing on the short-range region (step S1313). Then, the imaging apparatus 101 returns to the main routine in FIG. 21.

Figure 25:
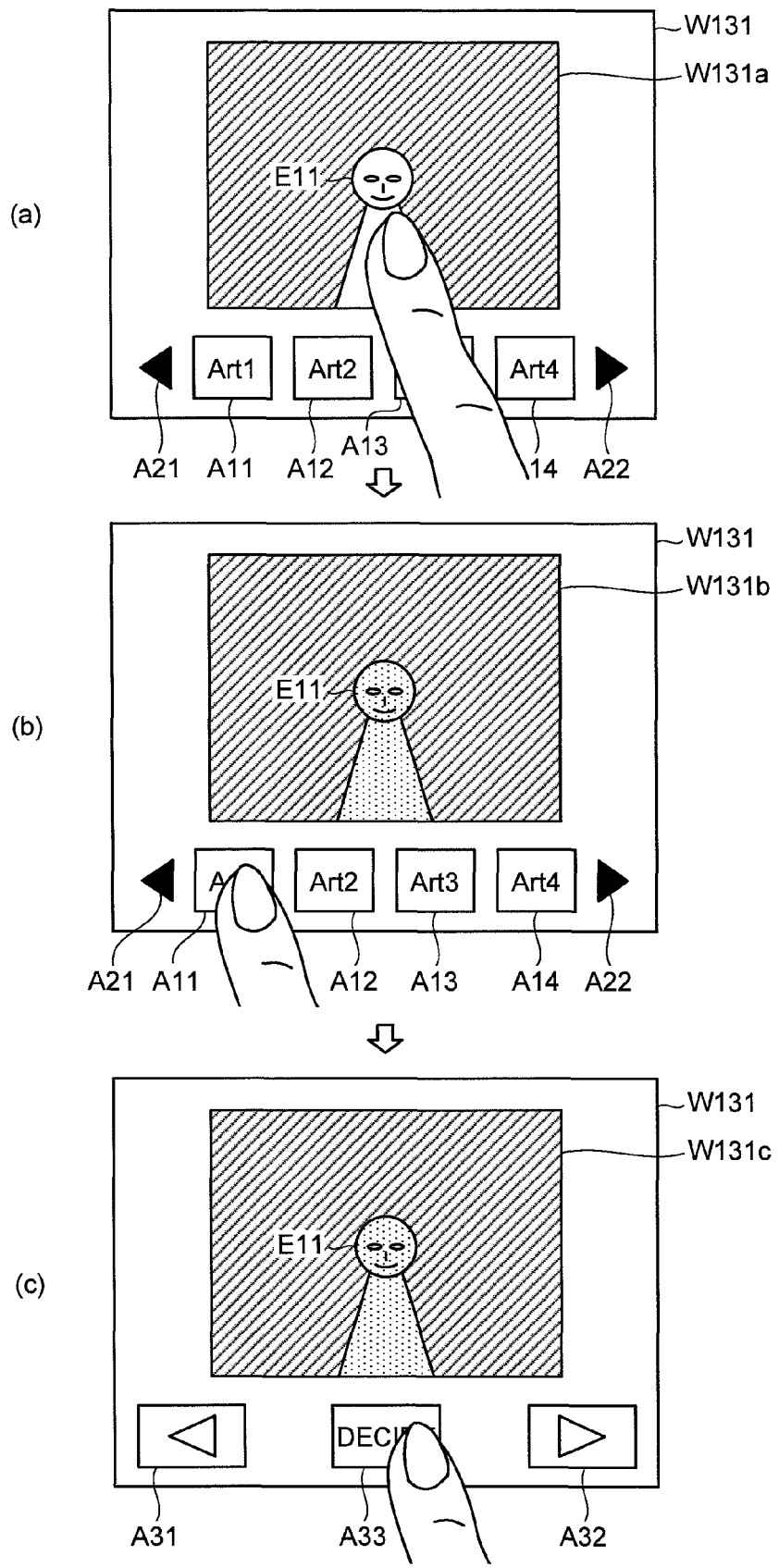
FIG. 25 is a diagram illustrating an example of the image displayed by the display unit of an imaging apparatus according to a third embodiment of the present invention.

FIG. 25 is a schematic diagram illustrating an overview of the processing of steps S1311 to S1313 in FIG. 24. As illustrated in FIG. 25, the user first touches a short-range region E11 of a live view image W131a displayed on a display screen W131 by the display unit 25 (FIG. 25(*a*)). Then, the user touches the special effect icon A11 as a desired special effect icon (FIG. 25(*b*)). In this case, the image processing unit 14 performs the special effect processing in accordance with the special effect icon on the short-range region E11. Then, the user touches the special effect icon A33 that receives input of an operation signal instructing a decision of special effect processing by manual settings (FIG. 25(*c*)). Accordingly, the image processing unit 14 can perform the special effect processing desired by the user on the short-range region. Incidentally, the image W131a in FIG. 25 schematically illustrates a 3D image as a plane.

The description will continue by returning to FIG. 24. If, in step S1311, the short-range region (person) of the 3D image displayed by the display unit 25 is not touched (step S1311: No) and an operation to operate a special effect icon is performed to select the special effect processing (step S1314: Yes), the region setting unit 1326 sets the selected special effect processing from the special effect processing set at that time for the entire image (step S1315). Then, the imaging apparatus 101 returns to the main routine in FIG. 21. If the short-range region is touched, the special effect processing may be set to only the background region.

A case when the face region detected by the face detection unit 322 is not equal to or more than the predetermined value (step S1302: No), a short-range region and a background region cannot be isolated from each of the left-eye image and the right-eye image (step S1305: No), or characteristics of the face detected by the face detection unit 322 cannot be determined (step S1306: No) will be described. In this case, the image processing unit 14 references the second special effect processing information table T12 stored in the second special effect processing information storage unit 272b to perform the special effect processing with the highest degree of recommendation on the entire region of each of the left-eye image and the right-eye image if there is no manual setting of special effect processing by the user (step S1316).

Subsequently, if the menu switch 215 is operated (step S1317: Yes), the display control unit 1327 causes the display unit 25 to display the special effect icons (step S1318).

Then, if an operation to select a special effect icon displayed by the display unit 25 is performed to select the special effect processing (step S1319: Yes), the region setting unit 1326 sets the selected special effect processing from the special effect processing set at that time (step S1320). Then, the imaging apparatus 101 returns to the main routine in FIG. 21.

If, in step S1312, no special effect processing is selected (step S1312: No), the imaging apparatus 101 proceeds to step S1314.

If, in step S1314, no special effect processing is selected (step S1314: No), if, in step S1317, the menu switch 215 is not operated (step S1317: No), or if, in step S1319, no special effect processing is selected (step S1319: No), the imaging apparatus 101 returns to the main routine in FIG. 21.

According to the third embodiment of the present invention described above, the same effect as the effect of the second embodiment is obtained. Further, the image processing unit 14 can perform the special effect processing set by manual settings of the user on the short-range region. As a result, different special effect processing can be performed on each of the short-range region and the background region so that captured images can be expressed more creatively.

In the second and third embodiments, if the characteristic determination unit 1325 determines characteristics of the face detected by the face detection unit 322, the first special effect processing information table T11 is referenced to set the special effect processing with the highest degree of recommendation as the processing to be performed by the image processing unit 14 and the region setting unit 1326 sets the background region as a region where the image processing unit 14 performs special effect processing, but the special effect processing set to the background region may be changed by, for example, the menu switch 215.

First Modification of the Third Embodiment

In the above embodiments, the region setting unit 1326 sets content of the special effect processing performed by the image processing unit 14 in accordance with characteristics of a face determined by the characteristic determination unit 1325, but, for example, faces detected by the face detection unit 322 may be registered so as to set content of the special effect processing to be performed by the image processing unit 14 by associating with the registered faces.

Figure 26:
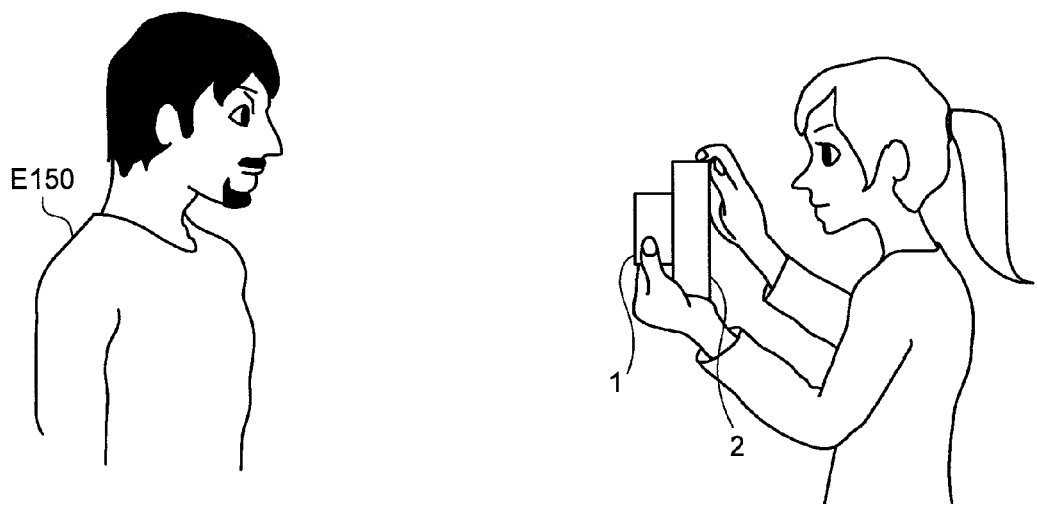
FIG. 26 is a diagram illustrating the situation when a subject is shot by an imaging apparatus according to a first modification of the third embodiment of the present invention.
Figure 27:
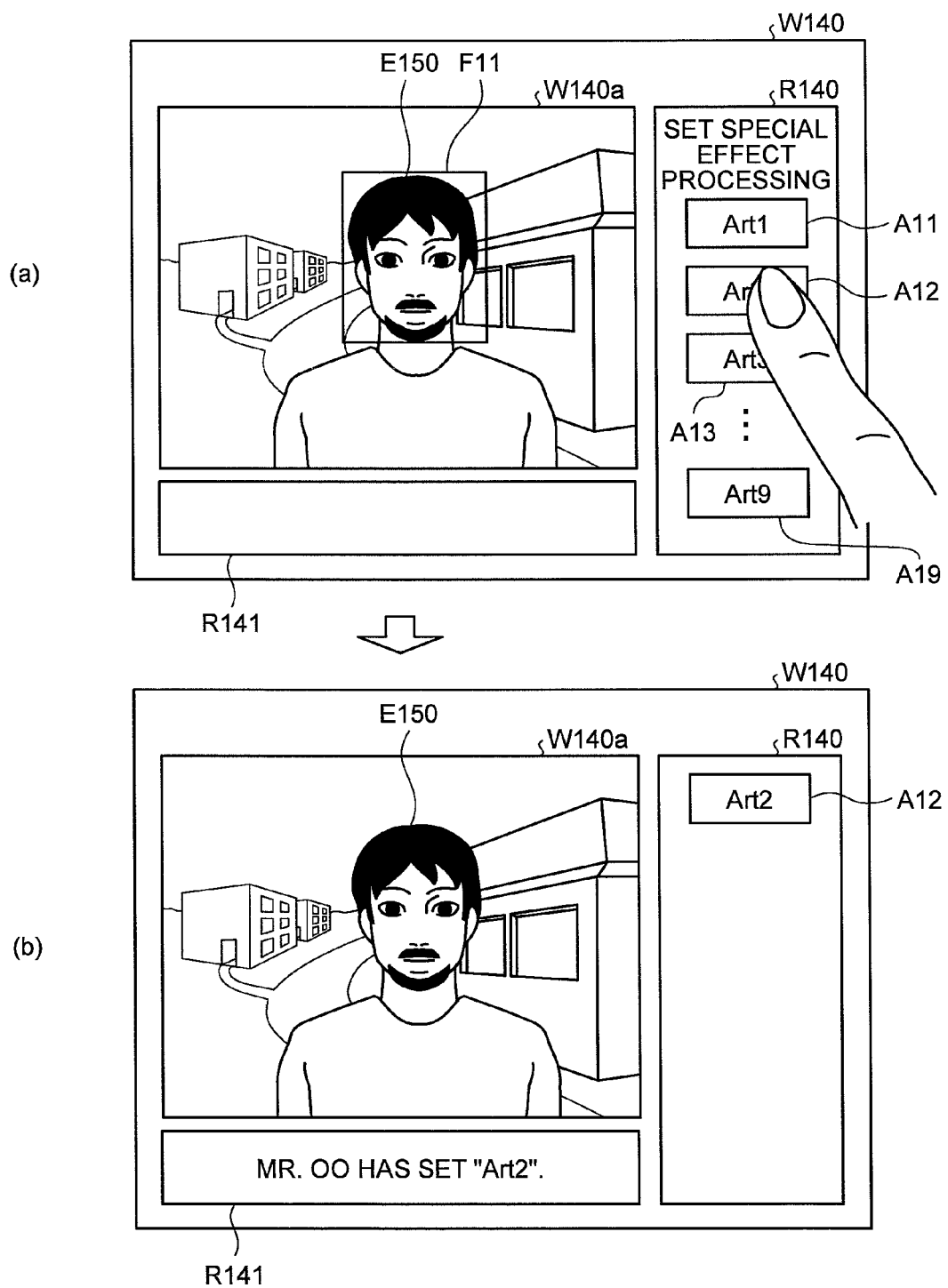
FIG. 27 is a diagram illustrating an example of the screen transition displayed by the display unit of the imaging apparatus in the situation illustrated in FIG. 26.

FIG. 26 is a diagram illustrating the situation when a subject is shot by an imaging apparatus 101 according to a first modification of the third embodiment. FIG. 27 is a diagram illustrating an example of the screen transition displayed by the display unit 25 in the situation illustrated in FIG. 26. The imaging apparatus 101 is configured in the same manner as the imaging apparatus 101 described above and thus, a description thereof is omitted.

As illustrated in FIGS. 26 and 27, the user decides the composition when shooting a subject E150 while viewing, for example, a live view image W140a displayed on a display screen W140 in FIG. 27. In the situation illustrated in FIG. 27, the display control unit 1327 causes the live view image W140a to display a frame F11 corresponding to a face region detected by the face detection unit 322. If, at this point, the user touches the frame F11 on the live view image W140a displayed by the display unit 25, the control unit 320 causes the nonvolatile memory 270 to store face information containing characteristics of the face of the frame F11 in accordance with an operation signal input from the touch panel 26.

Subsequently, the display control unit 1327 causes a right region R140 on the display screen W140 to display special effect icons A11 to A19. Then, if the user touches one of the special effect icons A11 to A19 displayed by the display unit 25 (FIG. 27(a)), the control unit 320 causes the nonvolatile memory 270 to store content of the special effect processing corresponding to the special effect icon touched by the user by associating with the face the nonvolatile memory 270 is caused to store.

Then, the display control unit 1327 causes the right region R140 on the display screen W140 displayed by the display unit 25 to display special effect processing corresponding to content of the set special effect processing and also causes a lower region R141 of the display screen W140 to display support messages (FIG. 27(b)).

Thus, according to the first modification of the third embodiment, if the face detection unit 322 detects a face matching face information stored in the nonvolatile memory 270, the region setting unit 1326 can automatically set content of the special effect processing associated with the face information to the image processing unit 14.

Other Embodiments

In the above embodiments, the region setting unit may set a region of a person including a face detected by the face detection unit as a region where the image processing unit performs special effect processing. Accordingly, an image in which special effect processing is performed on a person can be generated.

In the above embodiments, if the face detection unit detects a plurality of faces, the region setting unit may set a region of a person in a center region taken in each of a pair of images or a person exceeding a threshold may set as a region where the image processing unit performs special effect processing. Accordingly, an image in which special effect processing is performed only on a main subject can be generated.

In the above embodiments, content of the special effect processing may be changed in accordance with the position difference calculated by the position difference calculation unit.

In the above embodiments, the image processing unit performs special effect processing during shooting, but the present processing may be performed on a 3D image or 2D image when, for example, image data stored in the external memory is played back.

In the above embodiments, still image shooting is taken as an example, but the present processing can also be applied to dynamic image shooting.

In the above embodiments, the imaging apparatus is assumed to be a digital single-lens reflex camera, but the present processing can also be applied to various electronic devices equipped with a display function such as a digital camera in which a lens unit and a main body are integrally formed, a digital camcorder, and a mobile phone with a camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus, comprising:
    an imaging unit that generates a left-eye image and a right-eye image mutually having a parallax by capturing a subject;
    an image processing unit that performs special effect processing;
    a region setting unit that automatically sets a region including the subject contained in each of the left-eye image and the right-eye image as a region where the image processing unit performs the special effect processing, wherein the image processing unit performs image processing other than the special effect processing on areas other than the set region contained in each of the left-eye image and the right-eye image;
    a parallax amount calculation unit that calculates a parallax amount of the left-eye image and the right-eye image by superimposing a similar region contained in each of the left-eye image and the right-eye image;
    an isolation unit that isolates a short-range region and a background region from the region of each of the left-eye image and the right-eye image in accordance with the parallax amount calculated by the parallax amount calculation unit; and
an image processing setting unit that sets the background region as the region where the image processing unit performs the special effect processing.

2. The imaging apparatus according to claim 1, further comprising a position difference calculation unit that calculates a position difference of a position of the subject contained in the left-eye image and the right-eye image,
wherein the region setting unit automatically sets the region where the image processing unit performs the special effect processing on the pair of images on the basis of the position difference calculated by the position difference calculation unit.

3. The imaging apparatus according to claim 2, further comprising a threshold setting unit that sets a threshold that isolates a subject region and a background region in each of the left-eye image and the right-eye image on the basis of the position difference calculated by the position difference calculation unit,
wherein the region setting unit automatically sets the region where the position difference calculated by the position difference calculation unit exceeds the threshold as the region where the image processing unit performs the special effect processing.

4. The imaging apparatus according to claim 3, further comprising a face detection unit that detects a face of a person from one of the pair of images,
wherein the image processing unit changes content of the special effect processing in accordance with a detection result of the face detection unit.

5. The imaging apparatus according to claim 4, further comprising:
a display unit that displays the image corresponding to the pair of pieces of image data;
an input unit that receives input of an operation signal; and
a threshold change unit that changes the threshold set by the threshold setting unit in accordance with the operation signal input from the input unit.

6. The imaging apparatus according to claim 5, wherein the input unit is a touch panel provided on a display screen of the display unit to receive the input of the operation signal in accordance with a touch position of an object from outside.

7. The imaging apparatus according to claim 6, wherein the region setting unit sets the region of the person including the face detected by the face detection unit as the region where the image processing unit performs the special effect processing.

8. The imaging apparatus according to claim 7, wherein if the face detection unit detects a plurality of faces, the region setting unit sets the region of the person in a center region taken in each of the pair of images or the person exceeding the threshold as the region where the image processing unit performs the special effect processing.

9. The imaging apparatus according to claim 8, wherein the image processing unit changes the content of the special effect processing in accordance with the position difference calculated by the position difference calculation unit.

10. The imaging apparatus according to claim 1, further comprising a face detection unit that detects a face contained in each of the left-eye image and the right-eye image,
wherein if the face detected by the face detection unit is in the short-range region, the image processing setting unit sets the background region as the region where the image processing unit performs the special effect processing.

11. The imaging apparatus according to claim 10, further comprising:
a characteristic determination unit that determines characteristics of the face detected by the face detection unit; and
a first special effect processing information storage unit storing first special effect processing information that provides a degree of recommendation in accordance with a combination of the characteristics determined by the characteristic determination unit and the special effect processing that can be performed by the image processing unit on the left-eye image and the right-eye image,
wherein if the characteristic determination unit determines the characteristics of the face detected by the face detection unit, the image processing setting unit references the first special effect processing information to set the special effect processing with the high degree of recommendation as processing to be performed by the image processing unit.

12. The imaging apparatus according to claim 11, further comprising a second special effect processing information storage unit storing second special effect processing information that provides the degree of recommendation of the special effect processing that can be performed by the image processing unit on the left-eye image and the right-eye image,
wherein if the face detected by the face detection unit is not in the short-range region, the image processing setting unit references the second special effect processing information to set the special effect processing with the high degree of recommendation as processing to be performed by the image processing unit.

13. The imaging apparatus according to claim 12, further comprising:
a display unit that displays the image corresponding to the left-eye image and the right-eye image;
a display control unit that causes the display unit to display icons about each piece of the special effect processing that can be performed by the image processing unit; and
an input unit that receives input of an operation signal instructing a selection of the icon displayed by the display unit,
wherein the image processing setting unit sets the special effect processing corresponding to the icon selected by the input unit.

14. The imaging apparatus according to claim 13, wherein the region setting unit sets the region of the person including the face detected by the face detection unit as the region where the image processing unit performs the special effect processing.

15. The imaging apparatus according to claim 11, wherein if the face detection unit detects a plurality of faces, the region setting unit sets the region of a center person taken in each of the left-eye image and the right-eye image as the region where the image processing unit performs the special effect processing.

16. The imaging apparatus according to claim 12, wherein the image processing unit changes content of the special effect processing in accordance with the parallax amount calculated by the parallax amount calculation unit.

17. The imaging apparatus according to claim 1, further comprising
a stereoscopic image generation unit that causes a left-eye image storage unit to store the left-eye image and a right-eye image storage unit to store the right-eye image.

18. An imaging method executed by an imaging apparatus comprising:

generating a left-eye image and a right-eye image mutually having a parallax by capturing a subject;

setting, automatically, a region including the subject contained in each of the left-eye image and the right-eye image to define a special effects processing region;

performing special effect processing on the special effects processing region of each of the left-eye image and the right-eye image, and performing image processing other than the special effect processing on areas other than the set special effects processing region in each of the left-eye image and the right-eye image;

calculating a parallax amount of the left-eye image and the right-eye image by superimposing a similar region contained in each of the left-eye image and the right-eye image;

isolating a short-range region and a background region from the region of each of the left-eye image and the right-eye image in accordance with the parallax amount calculated; and setting the background region as the region where the image processing unit performs the special effect processing.

19. A non-transitory computer-readable storage medium with an executable program stored thereon, wherein the program instructs a processor to perform:

generating a left-eye image and a right-eye image mutually having a parallax by capturing a subject;

setting, automatically, a region including the subject contained in each of the left-eye image and the right-eye image to define a special effects processing region;

performing special effect processing on the special effects processing region of each of the left-eye image and the right-eye image, and performing image processing other than the special effect processing on areas other than the set special effects processing region in each of the left-eye image and the right-eye image;

calculating a parallax amount of the left-eye image and the right-eye image by superimposing a similar region contained in each of the left-eye image and the right-eye image;

isolating a short-range region and a background region from the region of each of the left-eye image and the right-eye image in accordance with the parallax amount calculated; and setting the background region as the region where the image processing unit performs the special effect processing.

\* \* \* \* \*